United States Patent
Kwon et al.

(10) Patent No.: US 11,537,230 B2
(45) Date of Patent: Dec. 27, 2022

(54) ELECTRONIC DEVICE FOR IDENTIFYING GESTURE PERFORMED BY STYLUS PEN AND METHOD FOR OPERATING THE SAME

(71) Applicant: Samsung Electronics Co., Ltd., Suwon-si (KR)

(72) Inventors: Banghyun Kwon, Suwon-si (KR); Inhyung Jung, Suwon-si (KR); Jaeyoung Choi, Suwon-si (KR); Sangheon Kim, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/930,688

(22) Filed: Jul. 16, 2020

(65) Prior Publication Data
US 2021/0034188 A1 Feb. 4, 2021

(30) Foreign Application Priority Data

Jul. 30, 2019 (KR) .......................... 10-2019-0092441

(51) Int. Cl.
*G06F 3/041* (2006.01)
*G06F 3/038* (2013.01)

(52) U.S. Cl.
CPC ............ *G06F 3/0416* (2013.01); *G06F 3/038* (2013.01)

(58) Field of Classification Search
None
See application file for complete search history.

(56) References Cited

U.S. PATENT DOCUMENTS 9,430,106 B1 8/2016 Olsen et al.
2012/0293415 A1 11/2012 Adhikari
(Continued)

FOREIGN PATENT DOCUMENTS

CN 102841701 A 12/2012
KR 10-2009-0124135 A 12/2009
(Continued)

OTHER PUBLICATIONS

International Search Report dated Oct. 13, 2020, issued in International Application No. PCT/KR2020/009369.
(Continued)

*Primary Examiner* — Stephen T. Reed
(74) *Attorney, Agent, or Firm* — Jefferson IP Law, LLP

(57) ABSTRACT

An electronic device is provided. The electronic device includes a sensing panel, at least one processor electrically connected to the sensing panel and the communication module, and a memory electrically connected to the at least one processor. The memory may store instructions configured to, when executed by the at least one processor, cause the at least one processor to, based on a pen signal from the stylus pen being detected through the sensing panel, perform a first operation identified based on the detected pen signal, and based on the pen signal from the stylus pen not being detected through the sensing panel, receive, through the communication module, at least one communication signal, identify a gesture based on information on a position of the stylus pen, included in the received at least one communication signal, and perform a second operation corresponding to the identified gesture. Various other embodiments are possible.

14 Claims, 35 Drawing Sheets

(56) References Cited

U.S. PATENT DOCUMENTS

| | | | |
|---|---|---|---|
| 2014/0055426 A1 | 2/2014 | Park et al. | |
| 2014/0218343 A1* | 8/2014 | Hicks | G06F 3/04883 |
| | | | 345/179 |
| 2014/0313171 A1 | 10/2014 | Hong et al. | |
| 2016/0357274 A1* | 12/2016 | Ahn | G06F 3/0383 |
| 2017/0322642 A1* | 11/2017 | Zhang | G06F 3/0383 |
| 2017/0322665 A1 | 11/2017 | Shim et al. | |
| 2018/0081456 A1 | 3/2018 | Li et al. | |
| 2018/0338107 A1 | 11/2018 | Yang et al. | |

FOREIGN PATENT DOCUMENTS

| | | |
|---|---|---|
| KR | 10-2014-0026966 A | 3/2014 |
| KR | 10-2016-0007612 A | 1/2016 |

OTHER PUBLICATIONS

European Search Report dated Dec. 9, 2020, issued in European Application No. 20187324.7.

* cited by examiner

ELECTRONIC DEVICE FOR IDENTIFYING GESTURE PERFORMED BY STYLUS PEN AND METHOD FOR OPERATING THE SAME

CROSS-REFERENCE TO RELATED APPLICATION(S)

This application is based on and claims priority under 35 U.S.C. § 119(a) of a Korean patent application number 10-2019-0092441, filed on Jul. 30, 2019, in the Korean Intellectual Property Office, the disclosure of which is incorporated by reference herein in its entirety.

BACKGROUND

1. Field

The disclosure relates to an electronic device for identifying a gesture performed by a stylus pen and a method of operating the same. More particularly, the disclosure relates to identifying a gesture performed using the stylus pen based on information included in a communication signal received from the stylus pen, and are capable of performing an operation corresponding to the identified gesture.

2. Description of the Related Art

Electronic devices have been developed to receive various inputs from a user through a specific input device (e.g., a stylus pen) connected thereto through wireless communication. An electronic device may identify a location designated thereon by an input device having a pen function (which may be referred to using the term "stylus pen" for convenience of description in this disclosure), and may perform a function corresponding to the location.

The electronic device may detect a magnetic field generated by the stylus pen using an electromagnetic resonance (hereinafter referred to as "electromagnetic resonance (EMR)") method. The electronic device may identify the position of the stylus pen based on an induced electromotive force generated by the magnetic field for each channel.

The stylus pen may be connected to the electronic device through short-range communication (e.g., Bluetooth Low Energy (BLE)). The stylus pen may transmit, for example, information on the pressed state of a button disposed on the housing of the stylus pen to the electronic device through short-range communication, and the electronic device may perform a specific operation based on the received information.

The above information is presented as background information only to assist with an understanding of the disclosure. No determination has been made, and no assertion is made, as to whether any of the above might be applicable as prior art with regard to the disclosure.

SUMMARY

Depending on whether the button provided on the stylus pen is pressed, the electronic device may perform a specific operation. However, only a small number of operations of the electronic device can be mapped to turning the button provided in the stylus pen on or off. It may thus be difficult to effectively control applications that support various operations using the stylus pen.

Aspects of the disclosure are to address at least the above-mentioned problems and/or disadvantages and to provide at least the advantages described below. Accordingly, an aspect of the disclosure is to provide an electronic device and a method of operating the same are capable of identifying a gesture performed using the stylus pen based on information included in a communication signal received from the stylus pen, and are capable of performing an operation corresponding to the identified gesture.

Additional aspects will be set forth in part in the description which follows and, in part, will be apparent from the description, or may be learned by practice of the presented embodiments.

In accordance with an aspect of the disclosure, an electronic device is provided. The electronic device includes a sensing panel, at least one processor electrically connected to the sensing panel and the communication module, and a memory electrically connected to the at least one processor. The memory may store instructions configured to, when executed by the at least one processor, cause, the at least one processor to, based on a pen signal from the stylus pen being detected through the sensing panel, perform a first operation identified based on the detected pen signal, and based on the pen signal from the stylus pen being not detected through the sensing panel, receive, through the communication module, at least one communication signal, identify a gesture based on information on a position of the stylus pen, included in the received at least one communication signal, and perform a second operation corresponding to the identified gesture.

In accordance with another aspect of the disclosure, an electronic device is provided. The electronic device includes a communication module, at least one processor electrically connected to the communication module, and a memory electrically connected to the at least one processor. The memory may store instructions configured to, when executed by the at least one processor, cause the processor to receive, through the communication module, a first communication signal including first information indicating start of gesture input from a stylus pen, receive, through the communication module, a plurality of second communication signals from the stylus pen, identify one or more candidate gestures based on information on a position of the stylus pen, included in the received plurality of second communication signals, receive, through the communication module, a third communication signal after receiving the plurality of second communication signals, identify a gesture satisfying a specified condition among the one or more candidate gestures based on identifying second information indicating termination of the gesture input, included in the received third communication signal, and perform an operation corresponding to the identified gesture.

In accordance with another aspect of the disclosure, a method of operating an electronic device is provided. The method includes based on a pen signal from a stylus pen being detected through a sensing panel of the electronic device, performing a first operation identified based on the detected pen signal, and based on the pen signal from the stylus pen being not detected through the sensing panel, the method may include receiving, through a communication module of the electronic device, at least one communication signal, identifying a gesture based on information on a position of the stylus pen, included in the received at least one communication signal, and performing a second operation corresponding to the identified gesture.

According to various embodiments, it is possible to provide an electronic device capable of identifying a gesture performed using the stylus pen based on information included in a communication signal received from the stylus pen and capable of performing an operation corresponding to the identified gesture, and to provide a method of operating the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
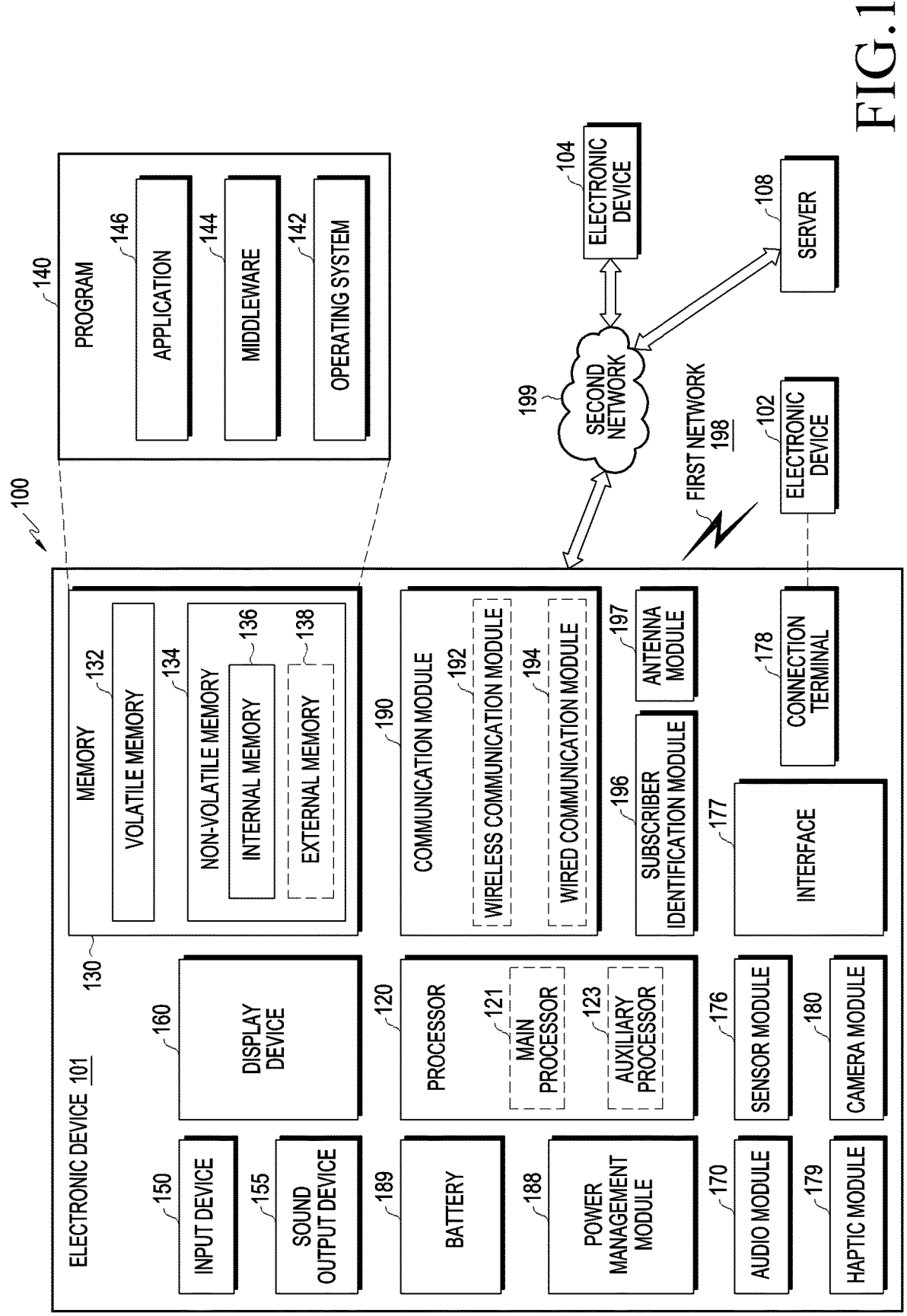
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or an external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
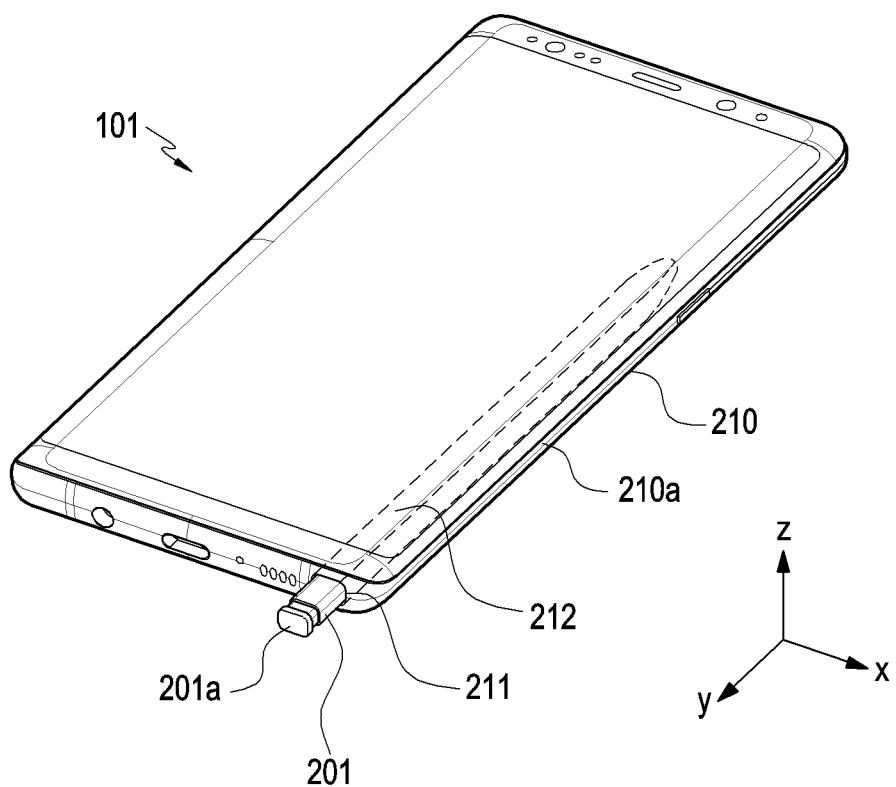
FIG. 2 is a perspective view illustrating an electronic device including a stylus pen according to an embodiment of the disclosure.

FIG. 2 is a perspective view illustrating an electronic device including a stylus pen (e.g., the electronic device 102 in FIG. 1) according to an embodiment of the disclosure. According to various embodiments, the stylus pen in this document may correspond to the input device 150 of FIG. 1 rather than the electronic device 102 of FIG. 1.

Referring to FIG. 2, the electronic device 101 of various embodiments may include the components illustrated in FIG. 1, and may include a structure into which a stylus pen 201 can be inserted. The electronic device 101 includes a housing 210, and may include a hole 211 in a portion of the housing 210, for example, a portion of the side surface 210a. The electronic device 101 may include a first internal space 212, which is an accommodation space connected to the hole 211, and the stylus pen 201 may be inserted into the first internal space 212. According to the illustrated embodiment, the stylus pen 201 may include a first button 201a, which is capable of being pressed, at one end thereof such that the stylus pen 201 can be easily taken out from the first internal space 212 of the electronic device 101. When the first button 201a is pressed, a repulsion mechanism associated with the first button 201a (e.g., a repulsion mechanism operated by at least one elastic member (e.g., a spring) may activated so as to cause the stylus pen 201 to be detached from the internal space 212.

Figure 3A:
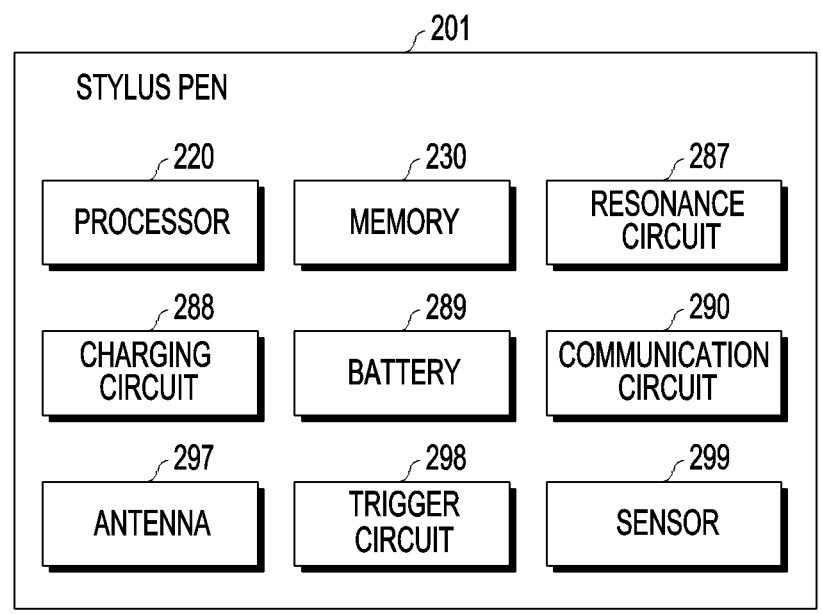
FIG. 3A is a block diagram illustrating a stylus pen according to an embodiment of the disclosure.

FIG. 3A is a block diagram illustrating a stylus pen (e.g., the stylus pen 201 in FIG. 2) according to an embodiment of the disclosure.

Referring to FIG. 3A, the stylus pen 201 according to an embodiment may include a processor 220, a memory 230, a resonance circuit 287, a charging circuit 288, a battery 289, a communication circuit 290, an antenna 297, a trigger circuit 298, and/or a sensor 299. In some embodiments, the processor 220 of the stylus pen 201, at least part of the resonance circuit 287 and/or at least part of the communication circuit 290 may be configured on a printed circuit board or in the form of a chip. The processor 220, the resonance circuit 287 and/or the communication circuit 290 may be electrically connected to the memory 230, the charging circuit 288, the battery 289, the antenna 297, the trigger circuit 298 and/or the sensor 299.

The processor 220 according to various embodiments may include a generic processor configured to execute a customized hardware module or software (e.g., an application). The processor 220 may include a hardware component (function) or a software element (program) including at least one of various sensors provided in the stylus pen, a data measurement module, an input/output interface, a module for managing the state or environment of the stylus pen 201, or a communication module. The processor 220 may include at least one of, for example, hardware, software, firmware, and a combination of two or more thereof. According to an embodiment, the processor 220 may be configured to transmit information indicating the pressed state of the button (e.g., the button 337 of FIG. 3B), sensing information acquired through the sensor 229, and/or information calculated based on the sensing information (e.g., information associated with the position of the stylus pen 201) to the electronic device 101 via the communication circuit 290.

The resonance circuit 287 according to various embodiments may resonate based on an electromagnetic field signal generated by a digitizer (e.g., the display device 160) of the electronic device 101, and may radiate an electromagnetic resonance (EMR) input signal (or a magnetic field). The electronic device 101 may identify the position of the stylus pen 201 on the electronic device 101 using the electromagnetic resonance input signal. For example, the electronic device 101 may identify the position of the stylus pen 201 based on the magnitude of an induced electromotive force (e.g., an output current) generated by the electromagnetic resonance input signal in each of a plurality of channels (e.g., a plurality of loop coils) within the digitizer. Meanwhile, the electronic device 101 and the stylus pen 201 have been described above as operating based on an EMR method. However, this is merely an example, and the electronic device 101 may generate a signal based on an electric field through an electrically coupled resonance (ECR) method. The resonance circuit of the stylus pen 201 may be resonated by an electric field. The electronic device 101 may identify a potential generated in a plurality of channels (e.g., electrodes) due to resonance in the stylus pen 201, and may also identify the position of the stylus pen 201 based on the potential. The stylus pen 201 may be implemented by an active electrostatic (AES) method, and a person ordinarily skilled in the art will understand that there is no limitation as to the type of implementation.

According to various embodiments, the memory 230 may store information associated with the operation of the stylus pen 201. For example, the information may include information for communication with the electronic device 101 and frequency information associated with an input operation of the stylus pen 201. In addition, the memory 230 may store a program (or an application, an algorithm, or a processing loop) for calculating information about the position of the stylus pen 201 (e.g., coordinate information and/or displacement information) from the sensing data of the sensor 299. The memory 230 may also store a communication stack of the communication circuit 290. Depending on the implementation, the communication circuit 290 and/or the processor 220 may include a dedicated memory.

The resonance circuit 287 according to various embodiments may include a coil (or an inductor) and/or a capacitor. The resonance circuit 287 may resonate based on an electric field and/or a magnetic field (e.g., an electric field and/or a magnetic field generated by the digitizer of the electronic device 101) input thereto. When the stylus pen 201 transmits a signal by an EMR method, the stylus pen 201 may generate a signal including a resonant frequency based on an electromagnetic field generated by an inductive panel of the electronic device 101. When the stylus pen 201 transmits a signal by an AES method, the stylus pen 201 may generate a signal using capacity coupling with the electronic device 101. When the stylus pen 201 transmits a signal by an ECR method, the stylus pen 201 may generate a signal including a resonant frequency based on an electric field generated by a capacitive device of the electronic device 101. According to an embodiment, the resonance circuit 287 may be used to change the intensity or frequency of the electromagnetic field depending on a user's operating state. For example, the resonance circuit 287 may provide various frequencies for recognizing a hovering input, a drawing input, a button input, or an erasing input. For example, the resonance circuit 287 may provide various resonant frequencies by connecting a plurality of capacitors in various combinations, or may provide various resonant frequencies based on a variable inductor and/or a variable capacitor.

When the charging circuit 288 according to various embodiments is connected to the resonance circuit 287 based on a switching circuit, a resonance signal generated by the resonance circuit 287 may be rectified into a DC signal and may be provided to the battery 289. According to an embodiment, the stylus pen 201 may identify whether the stylus pen 201 is inserted into the electronic device 101 using the voltage level of the DC signal detected in the charging circuit 288.

According to various embodiments, the battery 289 may be configured to store power required for operating the stylus pen 201. The battery 289 may include, for example, a lithium-ion battery or a capacitor, and may be rechargeable or exchangeable. According to an embodiment, the battery 289 may be charged using power (e.g., a DC signal (DC power)) supplied from the charging circuit 288.

The communication circuit 290 according to various embodiments may be configured to perform a wireless communication function between the stylus pen 201 and the communication module 190 of the electronic device 101. According to an embodiment, the communication circuit 290 may transmit state information, input information, and/or position-related information of the stylus pen 201 to the electronic device 101 using a short-range communication method. For example, the communication circuit 290 may transmit direction information of the stylus pen 201 (e.g., motion sensor data) acquired through the trigger circuit 298, voice information input through a microphone, or information on the remaining amount of the battery 289 to the electronic device 101. For example, the communication circuit 290 may transmit sensing data acquired from the sensor 299 and/or information associated with the position of the stylus pen 201 identified based on the sensing data to the electronic device 101. For example, the communication circuit 290 may transmit information on the state of a button (e.g., the button 337 of FIG. 3B) provided on the stylus pen 201 to the electronic device 101. As an example, the short-range communication method may include at least one of Bluetooth, Bluetooth Low Energy (BLE), or wireless LAN.

The antenna 297 according to various embodiments may be used to transmit/receive a signal or power to/from the outside (e.g., the electronic device 101). According to an embodiment, the stylus pen 201 may include a plurality of antennas 297, and may select at least one antenna 297 suitable for a communication method among the plurality of antennas 297. Through the selected at least one antenna 297, the communication circuit 290 may exchange a signal or power with an external electronic device.

According to various embodiments, the trigger circuit 298 may include at least one button or a sensor circuit. According to an embodiment, the processor 220 may identify an input method (e.g., touch or push) or the type (e.g., an EMR button or a BLE button) of the button of the stylus pen 201. According to an embodiment, the sensor circuit may generate an electrical signal or a data value corresponding to an internal operating state or an external environmental state of the stylus pen 201. For example, the sensor circuit may include at least one of a motion sensor, a remaining battery capacity detection sensor, a pressure sensor, an optical sensor, a temperature sensor, a geomagnetic sensor, and a biometric sensor. According to an embodiment, the trigger circuit 298 may transmit a trigger signal to the electronic device 101 using an input signal of the button or a signal acquired through a sensor.

The sensor 299 according to various embodiments may include an acceleration sensor (e.g., accelerometer), a gyro sensor, and/or a geomagnetic sensor. The acceleration sensor may sense information about linear movement of the stylus pen 201. The gyro sensor may sense information related to rotation of the stylus pen 201. The geomagnetic sensor may sense information about a tilted state (e.g., an orientation) of the stylus pen 201. The processor 220 may transmit the information acquired from the sensor 299 to the electronic device 101 via the communication circuit 290. Alternatively, based on the information obtained from the sensor 299, the processor 220 may transmit information associated with the position of the stylus pen 201 (e.g., the coordinates of the stylus pen 201 and/or the displacement of the stylus pen 201) to the electronic device 101 via the communication circuit 290.

Figure 3B:
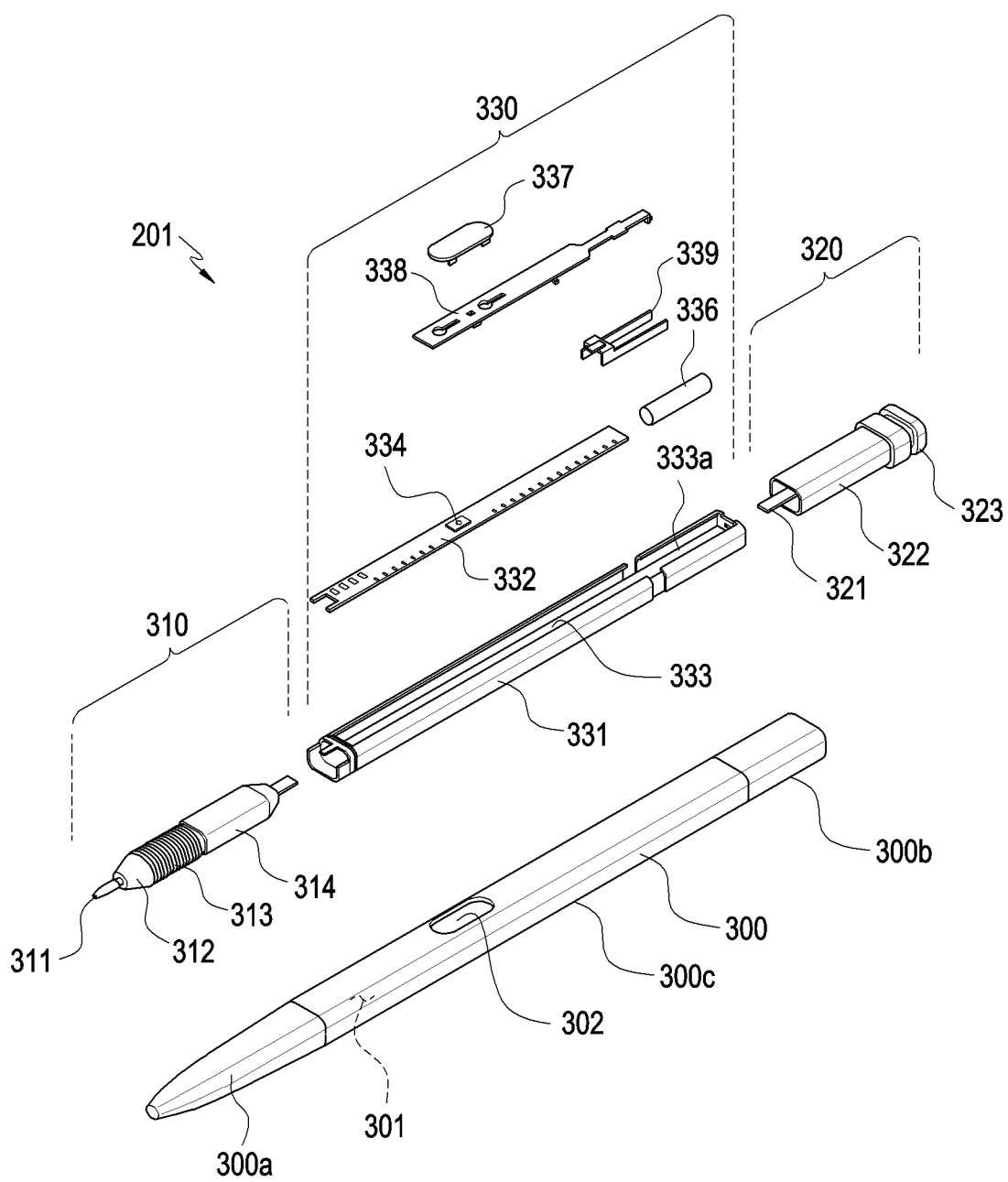
FIG. 3B is an exploded perspective view illustrating a stylus pen according to an embodiment of the disclosure.

FIG. 3B is an exploded perspective view illustrating a stylus pen (e.g., the stylus pen 201 in FIG. 2) according to an embodiment of the disclosure.

Referring to FIG. 3B, the stylus pen 201 may include a pen housing 300 forming the external appearance of the stylus pen 201 and an internal assembly inside the pen housing 300. In the illustrated embodiment, the internal assembly may be inserted into the pen housing 300 in a single assembly operation in the state in which several components mounted inside the stylus pen 201 are assembled together.

The pen housing 300 has an elongated shape between a first end portion 300a, a middle portion 300c and a second end portion 300b, and may include a second internal space 301 therein. The pen housing 300 may have an elliptical cross section having a long axis and a short axis, and may be formed in an elliptical column shape overall. As described above with reference to FIG. 2, the first internal space 212 of the electronic device 101 may also be formed to have an elliptical cross section corresponding to the shape of the pen housing 300. According to various embodiments, at least a portion of the pen housing 300 may include a synthetic resin (e.g., plastic) and/or a metallic material (e.g., aluminum). According to an embodiment, the first end portion 300a of the pen housing 300 may be made of a synthetic resin material. Various embodiments may be applied to the material of the pen housing 300.

The internal assembly may have an elongated shape corresponding to the shape of the pen housing 300. The internal assembly may be roughly divided into three components along the length direction thereof. For example, the inner assembly may include a coil section 310 disposed at a position corresponding to the first end portion 300a of the pen housing 300, an ejection section 320 disposed at a position corresponding to the second end portion 300b of the pen housing 300, and a circuit board section 330 disposed at a position corresponding to the body of the pen housing 300.

The coil section 310 may include a pen tip 311 exposed to the outside of the first end portion 300a when the internal assembly is fully inserted into the pen housing 300, a packing ring 312, a coil 313 wound a plurality of times, and/or a writing pressure sensor 314 configured to acquire a change in pressure depending on the compression of the pen tip 311. The packing ring 312 may include epoxy, rubber, urethane, or silicone. The packing ring 312 may be provided for waterproofing and dustproofing purposes, and may protect the coil section 310 and the circuit board section 330 from flooding or dust. According to an embodiment, the coil 313 may form a resonant frequency in a set frequency band (e.g., 500 kHz), and may be combined with at least one device (e.g., a capacitive element (a capacitor)) so as to adjust the resonant frequency formed by the coil 313 within a predetermined range.

The ejection section 320 may include a configuration for removing the stylus pen 201 from the first internal space 212 of the electronic device (e.g., the electronic device 101 of FIG. 2). According to an embodiment, the ejection section 320 may include a shaft 321, an ejection member 322 disposed around the shaft 321 and forming the overall external appearance of the ejection section 320, and a button unit 323 (e.g., the first button 201a in FIG. 2). When the internal assembly is fully inserted into the pen housing 300, the portion including the shaft 321 and the ejection member 322 is surrounded by the second end portion 300b of the pen housing 300, and at least a portion of the button unit 323 may be exposed to the outside of the second end portion 300b. A plurality of components (not illustrated), for example, cam members or elastic members, may be disposed in the ejection member 322 so as to form a push-pull structure. In an embodiment, the button unit 323 may be substantially coupled to the shaft 321 to reciprocate with respect to the ejection member 322. According to various embodiments, the button unit 323 may include a button having a locking structure to allow the user to pull out the stylus pen 201 using a fingernail. According to an embodiment, the stylus pen 201 may provide another input method by including a sensor that detects linear reciprocating motion of the shaft 321.

The circuit board section 330 may include a printed circuit board 332, a base 331 surrounding at least one surface of the printed circuit board 332, and an antenna. According to an embodiment, a substrate seating portion 333 on which a printed circuit board 332 is disposed is formed on the top surface of the base 331, and the printed circuit board 332 may be fixed in the state of being seated on the substrate seating portion 333. According to an embodiment, the printed circuit board 332 may include a first surface and a second surface, in which a variable capacitor or switch 334 connected to the coil 313 may be disposed on the first surface and a charging circuit, a battery 336, or a communication circuit may be disposed on the second surface. Here, according to an embodiment, the first surface and the second surface of the printed circuit board 332 may be different stacked surfaces in a vertically stacked structure. According to another embodiment, the first surface and the second surface may be different portions disposed along the longitudinal direction of the printed circuit board 332. The battery 336 may include an electric double-layered capacitor (EDLC). The charging circuit is located between the coil 313 and the battery, and may include a voltage detector circuit and a rectifier. Here, the battery 336 may not necessarily be disposed on the second surface of the printed circuit board 332. The position of the battery 336 may be variously set depending on various mounting structures of the circuit board 330, and may be disposed at a position different from that illustrated in the drawing.

The antenna may include an antenna structure 339 as in the example illustrated in FIG. 3B and/or an antenna embedded in the printed circuit board 332. According to various embodiments, a switch 334 may be provided on the printed circuit board 332. The second button 337 provided on the stylus pen 201 is used to push the switch 334, and may be exposed to the outside through a side opening 302 in the pen housing 300. When the second button 337 is supported by the support member 338 and there is no external force acting on the second button 337, the support member 338 provides elastic restoring force to restore or hold the second button 337 in the state of being disposed at a predetermined position.

The circuit board section 330 may include, for example, a packing ring such as an O-ring. According to an embodiment, O-rings made of an elastic body may be disposed at opposite ends of the base 331 to form a sealing structure between the base 331 and the pen housing 300. In some embodiments, the support member 338 may partially come into close contact with the inner wall of the pen housing 300 around the side opening 302 so as to form a sealing structure. For example, the circuit board section 330 may also include a waterproof and dustproof structure similar to the packing ring 312 of the coil section 310 on at least a portion thereof.

The stylus pen 201 may include a battery seating portion 333a in which the battery 336 is disposed on the top surface of the base 331. The battery 336 that can be mounted in the battery seating portion 333a may include, for example, a cylinder type battery.

The stylus pen 201 may include a microphone (not illustrated) and/or a speaker. The microphone and/or the speaker may be directly connected to the printed circuit board 332, or may be connected to a separate flexible printed circuit board (FPCB) (not illustrated) connected to the printed circuit board 332. According to various embodiments, the microphone and/or the speaker may be disposed at a position parallel to the second button 337 in the lengthwise direction of the stylus pen 201.

Figure 4:
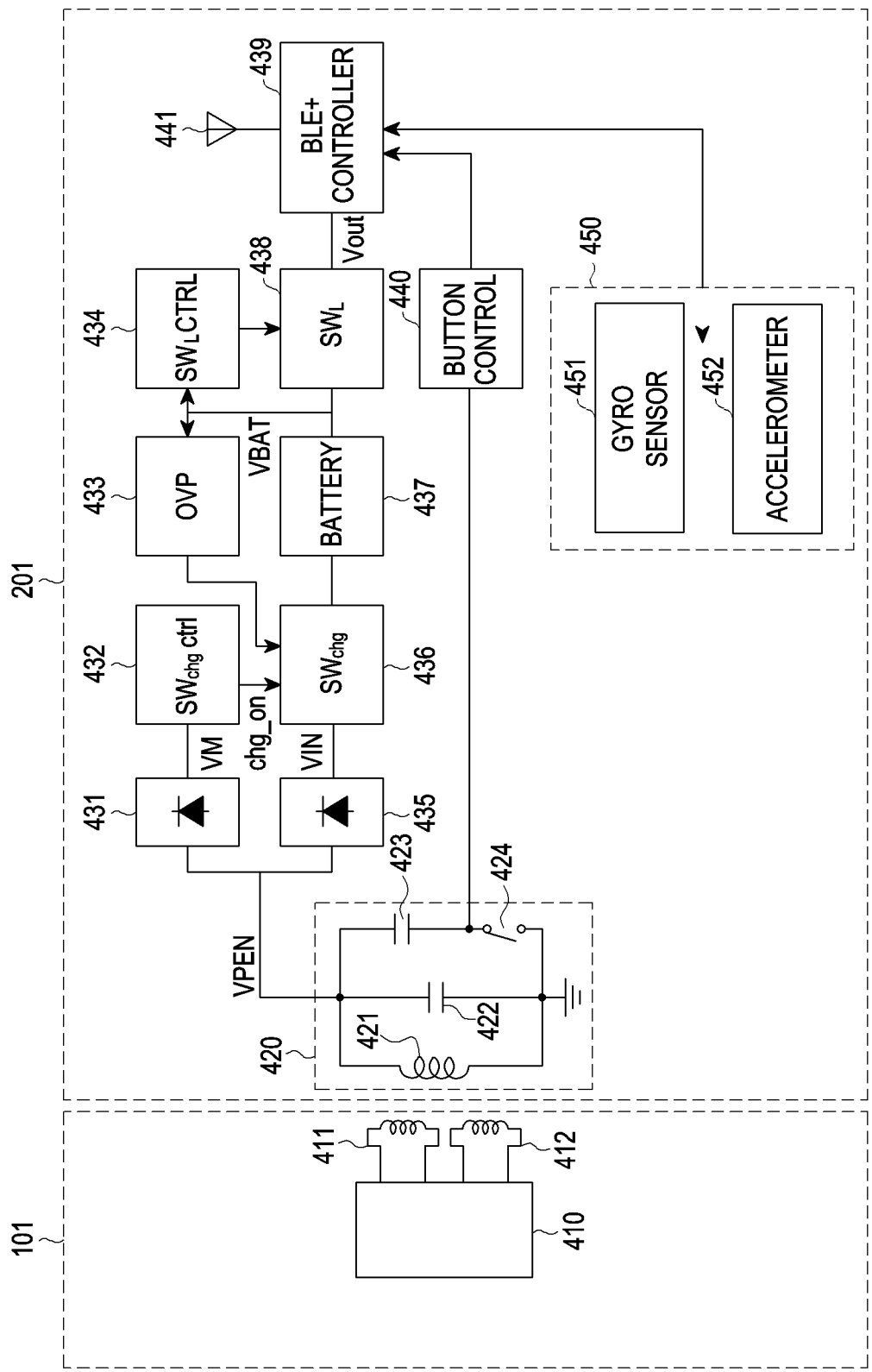
FIG. 4 is a view illustrating a configuration of an electronic device and a stylus pen according to an embodiment of the disclosure.

FIG. 4 is a view illustrating a configuration of an electronic device and a stylus pen according to an embodiment of the disclosure.

Referring to FIG. 4, the electronic device 101 may include a pen controller 410. The pen controller 410 may include, for example, at least one amplifier connected to at least one coil 411 or 412. The pen controller 410 may include at least one coil 411 or 412, and may provide charging power to the stylus pen 201 through the at least one coil 411 or 412. Alternatively, a sensing panel controller (e.g., the sensing panel controller 511 in FIG. 5) may provide a signal having a pattern through the at least one coil 411 or 412. The pattern is shared in advance with the stylus pen 201, and may include a pattern for controlling the stylus pen 201, including, for example, a charging start instruction pattern, a charging termination instruction pattern, and a detection pattern. Although two coils 411 and 412 for providing a charging signal or a signal having a pattern for control are illustrated, this is merely an example, and the number of coils is not limited thereto.

According to various embodiments, the resonance circuit 420 of the stylus pen 201 (e.g., the resonance circuit 287 in FIG. 3A) may include a coil 421, at least one capacitor 422 or 423, and/or a switch 424. When the switch 424 is in the off state, the coil 421 and the capacitor 422 may constitute a resonance circuit, and when the switch 424 is in the on state, the coil 421 and the capacitors 422 and 423 may constitute a resonance circuit. Accordingly, the resonant frequency of the resonance circuit 420 may be changed depending on the on/off state of the switch 424. For example, the electronic device 101 may identify the on/off state of the switch 424 based on the frequency of the signal from the stylus pen 201.

According to various embodiments, at least one rectifier 431 or 435 may rectify an alternating current (AC) waveform signal VPEN output from the resonance circuit 420, and may output a rectified signal. The charging switch controller (SW$_{chg}$ ctrl) 432 may receive the rectified signal VM output from the rectifier 431. Based on the rectified signal VM, the charging switch controller 432 may identify whether the signal generated by the resonance circuit 420 is a signal for charging or a signal for position detection. For example, the charging switch controller 432 may identify whether the signal generated by the resonance circuit 420 is a signal for charging or a signal for position detection based on, for example, the magnitude of the voltage of the rectified signal VM. When it is identified that the signal generated by the resonance circuit 420 is a signal for charging, the charging switch controller 432 may control the charging switch (SW$_{chg}$) 436 to the on state. The charging switch controller 432 may transmit a charging start signal (chg_on) to the charging switch 436. In this case, the rectified signal VIN may be transmitted to the battery 437 (e.g., the battery 289 in FIG. 3A) through the charging switch 436. The battery 437 may be charged using the received rectified signal VIN. An over-voltage protection circuit (OVP) 433 may identify the battery voltage VBAT, and may control the charging switch 436 to an off state when the battery voltage exceeds the over-voltage threshold.

According to various embodiments, a load switch controller (SW$_L$ ctrl) 434 may control the load switch (SW$_L$) 438 to be turned on when it is identified that the battery voltage exceeds an operating voltage threshold. When the load switch 438 is turned on, power from the battery 437 may be transmitted to a BLE communication circuit/controller (BLE+controller) 439 (e.g., the communication circuit 290 and the processor 220 in FIG. 3A). The BLE communication circuit/controller 439 may operate using the received power. When the distance between the stylus pen 201 and the electronic device 101 is greater than a threshold distance, a button control circuit 440 may transmit information on the input of a button (e.g., the button 337) to the BLE communication circuit/controller 439. The BLE communication circuit/controller 439 may transmit the received information on the input of the button to the electronic device 101 via the antenna 441 (e.g., the antenna 297 in FIG. 3A). A sensor 450 (e.g., the sensor 299 in FIG. 3A) may include a gyro sensor 451 and/or an accelerometer 452. Sensing data acquired by the gyro sensor 451 and/or the accelerometer 452 may be transmitted to the BLE communication circuit/controller 439. The BLE communication circuit/controller 439 may transmit a communication signal including the received sensing data to the electronic device 101 via the antenna 441. Alternatively, the BLE communication circuit/controller 439 may identify information (e.g., coordinates and/or displacement of the stylus pen 201) associated with the identified position of the stylus pen 201 based on the received sensing data. The BLE communication circuit/controller 439 may transmit the identified information associated with the position of the stylus pen 201 to the electronic device 101 via the antenna 441. According to various embodiments, the BLE communication circuit/controller 439 may activate the accelerometer 452 when the stylus pen 201 is pulled out from the electronic device 101. The BLE communication circuit/the controller 439 may activate the gyro sensor 451 when the button (e.g., the button 337) is pressed. Meanwhile, the activation time is merely illustrative, and there is no limit as to the activation time for each sensor. In addition, the sensor 450 may further include a geomagnetic sensor. When only the accelerometer 452 is activated, the stylus pen 201 may provide acceleration information measured by the accelerometer 452 to the electronic device 101, and the electronic device 101 may operate based both on the position of the stylus pen 201, identified based on a pen signal, and on acceleration information.

Figure 5:
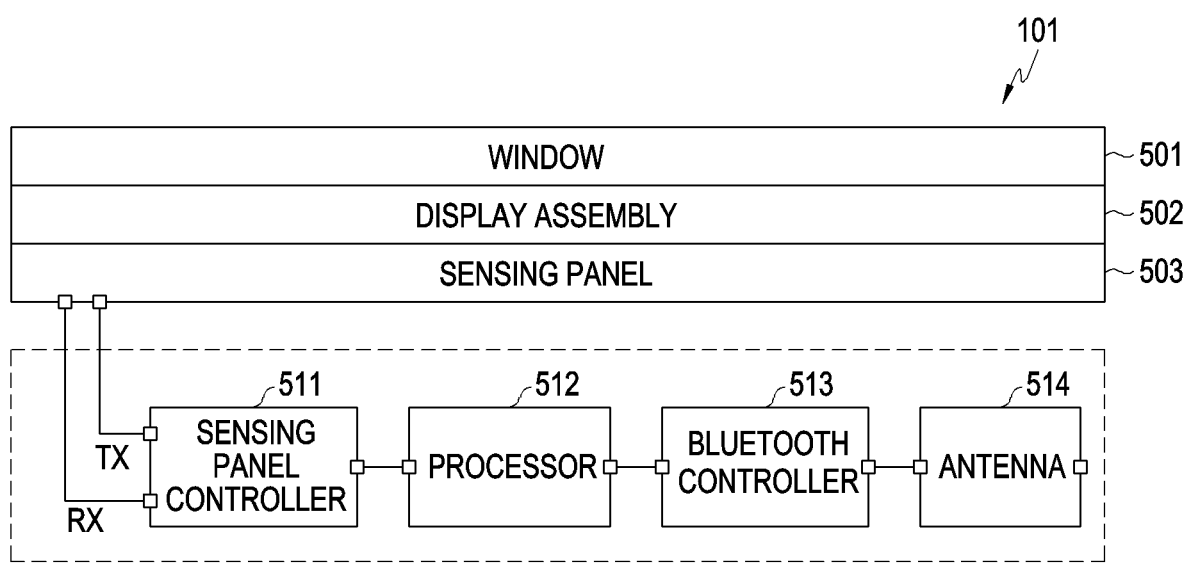
FIG. 5 is a view for describing a configuration of an electronic device according to an embodiment of the disclosure.

FIG. 5 is a view for describing a configuration of an electronic device according to an embodiment of the disclosure.

Referring to FIG. 5, the electronic device 101 may include a sensing panel controller 511, a processor 512 (e.g., the processor 120), a Bluetooth controller 513 (e.g., the communication module 190), and/or an antenna 514. The electronic device 101 may include a sensing panel 503, a display assembly 502 disposed on the sensing panel 503, and/or a window 501 disposed on the display assembly 502. Depending on the implementation, when the sensing panel 503 is implemented as a digitizer, a touch sensing panel (e.g., a touch screen panel (TSP)) may be further disposed above or below the sensing panel 503. The touch sensing panel may be located above the display assembly 502 depending on the implementation. The sensing panel 503 may be implemented as a digitizer, and may include a plurality of loop coils. According to various embodiments, when implemented as a digitizer, the sensing panel 503 may include an element (e.g., an amplifier) for applying an electrical signal (e.g., a transmission signal) to the loop coils. The sensing panel 503 may include elements (e.g., an amplifier, a capacitor, and an ADC) for processing a signal (e.g., an input signal) output from the loop coils. The sensing panel 503 may identify the position of the stylus pen 201 based on the magnitudes of signals output from respective loop coils (e.g., digital values converted for respective channels), and may output the position of the stylus pen 201 to the processor 120. Alternatively, depending on the implementation, the processor 120 may identify the position of the stylus pen 201 based on the magnitudes of signals output from respective loop coils (e.g., digital values converted for respective channels). For example, the sensing panel 503 may apply a current to at least one of the loop coils, and the at least one coil may form a magnetic field. The stylus pen 201 may be resonated by a magnetic field formed therearound, and a magnetic field may be formed by the stylus pen 201 due to the resonance. Owing to the magnetic field formed from the stylus pen 201, a current may be output from each of the loop coils. The electronic device 101 may identify the position of the stylus pen 201 based on the magnitudes of currents of respective channels of the loop coils (e.g., converted digital values). In order to determine the position of the stylus pen 201, the loop coils may include coils extending in one axis (e.g., an x-axis) direction and coils extending in another axis (e.g., a y-axis) direction, but there is no limit as to the arrangement form thereof. The sensing panel controller 511 may apply a transmission signal Tx to at least some of the plurality of loop coils of the sensing panel 503, and the loop coils receiving the transmission signal Tx may form a magnetic field. The sensing panel controller 511 may receive a reception signal Rx output from at least some of the plurality of loop coils in a time division manner. The sensing panel controller 511 may identify the position of the stylus pen 201 based on the reception signal Rx, and may transmit the position of the stylus pen 201 to the processor 512. Alternatively, when the electronic device 101 operates in the ECR method, the sensing panel 503 is implemented as a touch sensing panel, and the position of the stylus pen 201 may be identified based on an output signal from an electrode of the touch sensing panel. Alternatively, when the electronic device 101 detects a pen using the touch sensing panel, the pen may be detected based on a change in capacitance (mutual capacitance and/or self-capacitance) at an electrode of the touch sensing panel. Hardware capable of sensing a pen signal from the stylus pen of the digitizer or the touch sensing panel may be referred to as a sensing panel 503. In various embodiments, the electronic device 101 may detect the stylus pen (or the position of the stylus pen) by recognizing an electrical signal generated by the pen based on the AES method.

The sensing panel controller 511 may also identify whether the stylus pen 201 is inserted into (or coupled to) the electronic device 101 based on the reception signal, and may transmit the result of identification to the processor 512. Depending on the implementation, the sensing panel controller 511 may be implemented integrally with the sensing panel 503. The processor 512 may transmit a signal for wireless charging based on whether the stylus pen is inserted. The processor 512 may control the Bluetooth controller 513 based on whether the stylus pen is inserted, and when no wireless communication connection is established, the processor 512 may perform control such that the stylus pen 201 is connected for wireless communication. In addition, when the stylus pen 201 is mounted, the processor 512 may transmit charging capacity information to the electronic device 101, and when the stylus pen 201 is removed, the processor 512 may transmit information on button pressing and sensor data to the electronic device 101.

In addition, based on data received from the stylus pen 201, the processor 512 may perform control such that a charging signal and a control signal are sent to the sensing panel controller 511. Based on data received from the stylus pen 201, the processor 512 may identify a gesture and may perform an operation corresponding to the gesture. The processor 512 may transmit a function mapped to the gesture to an application. The Bluetooth controller 513 may transmit/receive information through the stylus pen 201 and the antenna 514. The display assembly 502 may include an element for displaying a screen. The window 501 may be made of a transparent material capable of accommodating the display assembly 502.

Figure 6A:
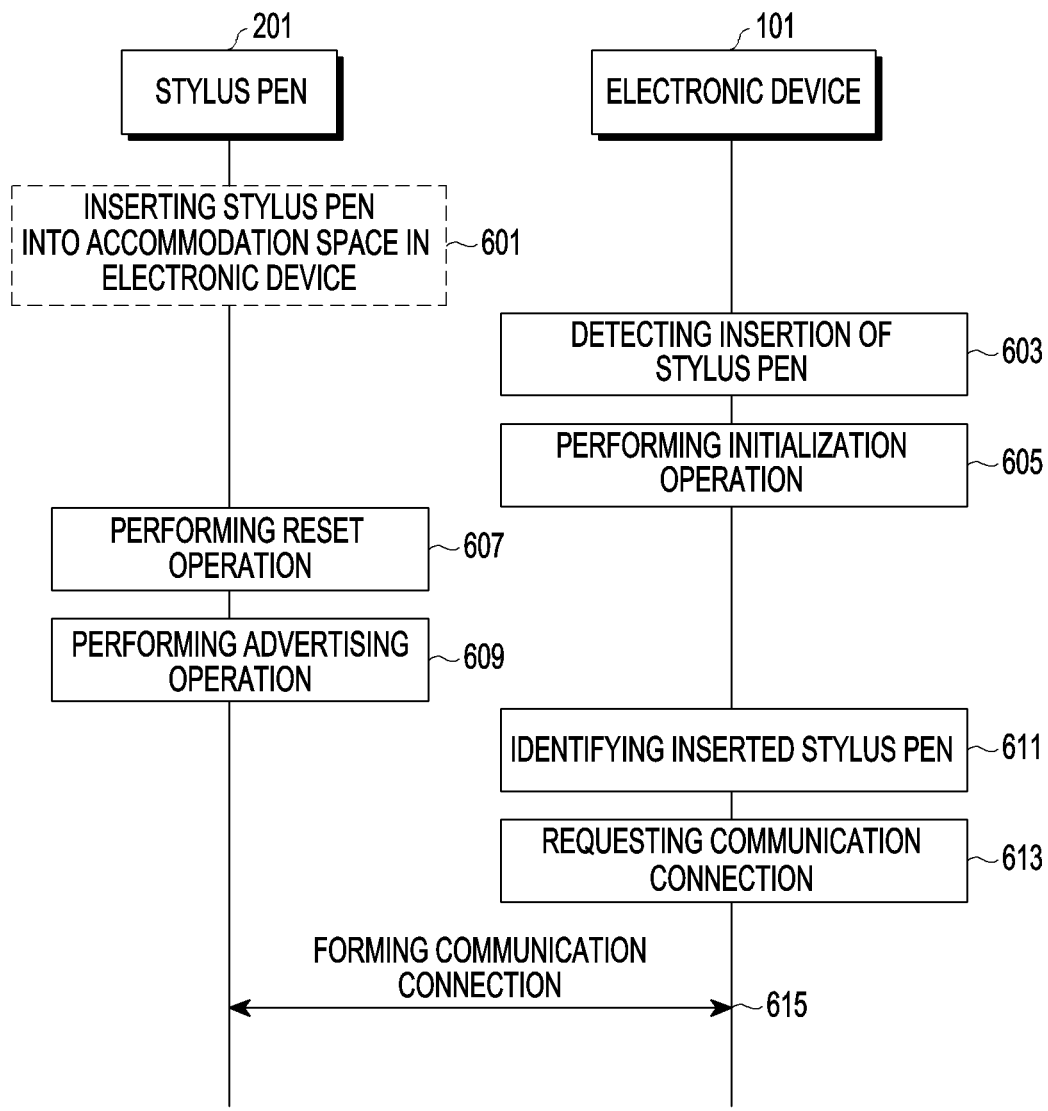
FIG. 6A is a flowchart for describing the operation of a stylus pen and an electronic device when the stylus pen is inserted into the electronic device according to an embodiment of the disclosure.

FIG. 6A is a flowchart for describing an operation of a stylus pen and an electronic device when the stylus pen is inserted into the electronic device according to an embodiment of the disclosure.

Referring to FIG. 6A, at operation 601, the stylus pen 201 may be inserted into an accommodation space in the electronic device 101. However, insertion into the accommodation space is merely illustrative, and the electronic device 101 may include a region (or space) in which the stylus pen 201 can be mounted (or attached) in addition to the storage space, in which case the stylus pen 201 may be detachably attached to the corresponding region (or space). It will be understood by a person ordinarily skilled in the art that the operation of the stylus pen 201 in this disclosure when located within the accommodation space may also be performed when the stylus pen 201 is attached to the mounting region (or space) in another embodiment. For example, the user may insert the stylus pen 201 into the accommodation space in the electronic device 101, and the corresponding operation is indicated by the dotted line in consideration of the fact that the corresponding operation is not an active operation of the stylus pen 201. The embodiment of FIG. 6A will be described with reference to the case where the stylus pen 201 is inserted into the electronic device 101 before a communication connection between the stylus pen 201 and the electronic device 101 is established. In this disclosure, when the electronic device 101 or the stylus pen 201 performs a specific operation, it may mean that the processor 120 included in the electronic device 101 or the processor 220 included in the stylus pen 201 performs the specific operation. When the electronic device 101 or the stylus pen 201 performs a specific operation, it may mean that the processor 120 included in the electronic device 101 or the processor 220 included in the stylus pen 201 causes other hardware to perform the specific operation. Alternatively, when the electronic device 101 or the stylus pen 201 performs a specific operation, it may mean that an instruction stored in a memory is executed or an instruction is stored in the memory such that the processor 120 included in the electronic device 101 or the processor 220 included in the stylus pen 201 performs the specific operation.

According to various embodiments, at operation 603, the electronic device 101 may detect insertion of the stylus pen 201. For example, the electronic device 101 may detect insertion of the stylus pen 201 based on the reception signal received from the stylus pen 201 in response to a transmission signal transmitted through the digitizer. It will be understood by a person ordinarily skilled in the art that the method of detecting insertion is not limited. At operation 605, the electronic device 101 may perform an initialization operation, and may transmit, for example, a reset command to the stylus pen 201. At operation 607, the stylus pen 201 may perform a reset operation. For example, the stylus pen 201 may release an existing BLE connection. At operation 609, the stylus pen 201 may perform an advertising operation. For example, the stylus pen 201 may broadcast an advertising signal. At operation 611, the electronic device 101 may identify the inserted stylus pen 201. The electronic device 101 may identify the inserted stylus pen 201 based on the received advertising signal. At operation 613, the electronic device 101 may request a communication connection. For example, the electronic device 101 may transmit a connection request signal in response to the advertising signal. At operation 615, the stylus pen 201 may establish a communication connection with the electronic device 101.

Figure 6B:
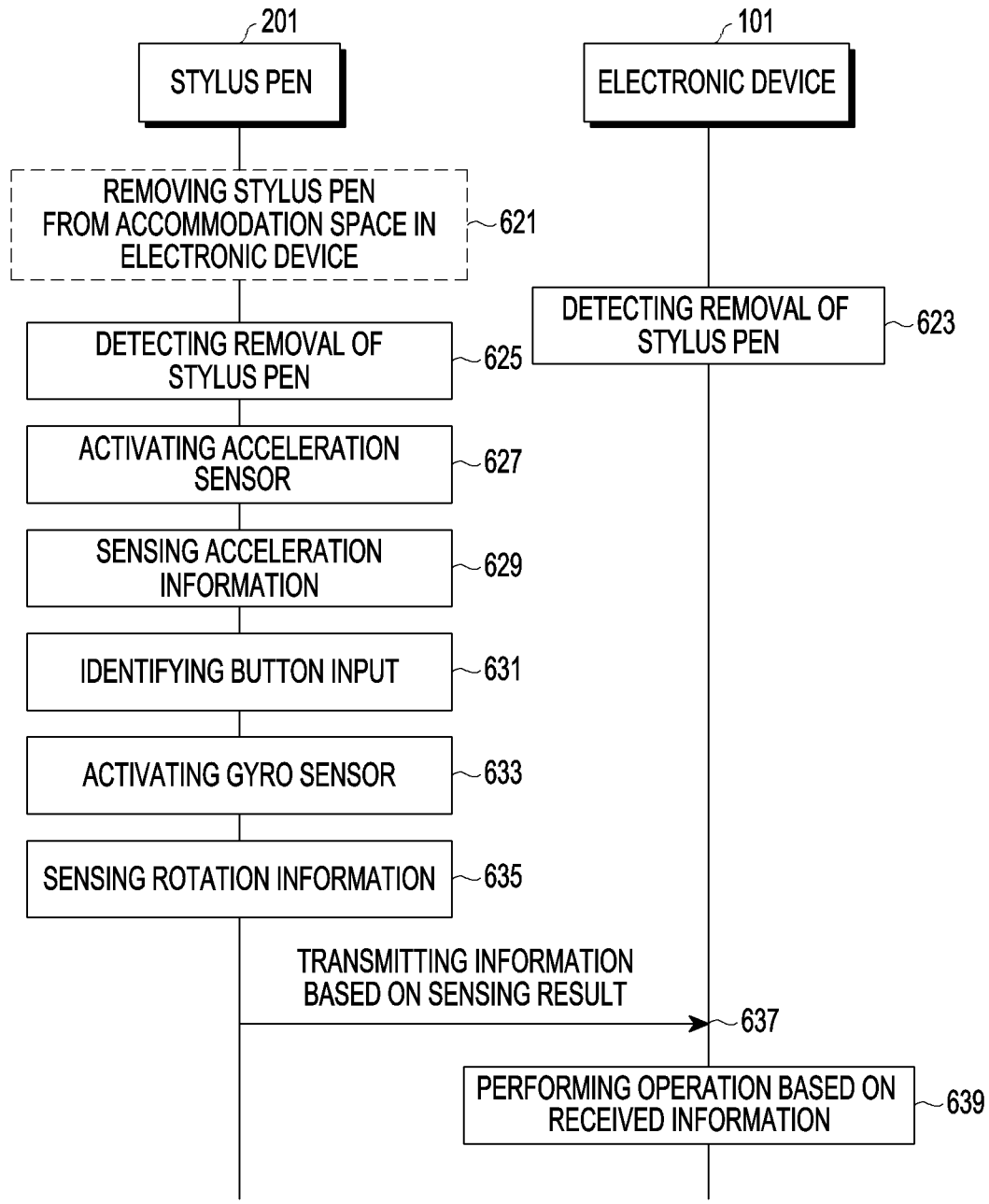
FIG. 6B is a flowchart for describing the operation of a stylus pen and an electronic device when the stylus pen is removed from the electronic device according to an embodiment of the disclosure.

FIG. 6B is a flowchart for describing an operation of a stylus pen and an electronic device when the stylus pen is removed from the electronic device according to an embodiment of the disclosure.

Referring to FIG. 6B, at operation 621, the stylus pen 201 may be removed from the accommodation space in the electronic device 101. For example, the user may take out the stylus pen 201 from the accommodation space in the electronic device 101. At operation 623, the electronic device 101 may detect the removal of the stylus pen 201. For example, the electronic device 101 may detect removal of the stylus pen 201 based on non-reception of a signal from the stylus pen 201, but there is no limitation as to the method for detecting removal. At operation 625, the stylus pen 201 may detect the removal of the stylus pen 201. For example, the stylus pen 201 may detect the removal of the stylus pen 201 based on non-reception of a signal from the electronic device 101, but there is no limitation as to the method for detecting the removal. When the detachment is detected, the stylus pen 201 may exchange a parameter (e.g., a connection interval and/or a slave latency) with the electronic device 101.

According to various embodiments, the stylus pen 201 may activate the acceleration sensor based on the removal detection at operation 627. The stylus pen 201 may sense acceleration information of the stylus pen 201 via the activated acceleration sensor at operation 629. Although not illustrated, the stylus pen 201 may transmit the sensed acceleration information to the electronic device 101. In various embodiments, the electronic device 101 may perform an operation based on the received acceleration information. In various embodiments, the stylus pen 201 may activate the acceleration sensor, and the gyro sensor, which consumes relatively high power, may be set to remain in the deactivated state.

According to various embodiments, at operation 631, the stylus pen 201 may identify an input through the button (e.g., the button 337). When the button input is identified, the stylus pen 201 may activate the gyro sensor at operation 633. The stylus pen 201 may sense rotation information via the activated gyro sensor at operation 635. At operation 637, the stylus pen 201 may transmit information based on the sensing result. For example, the stylus pen 201 may transmit sensing information, acquired via the acceleration sensor and the gyro sensor, to the electronic device 101. Alternatively, based on sensing information acquired via the acceleration sensor and the gyro sensor, the stylus pen 201 may identify the coordinates (e.g., two-dimensional coordinates or three-dimensional coordinates) of the stylus pen 201, and may transmit the identified coordinates to the electronic device 101. Alternatively, based on sensing information acquired via the acceleration sensor and the gyro sensor, the stylus pen 201 may identify displacement information on the coordinates (e.g., two-dimensional coordinates or three-dimensional coordinates) of the stylus pen 201, and may transmit the identified displacement information to the electronic device 101. At operation 639, the electronic device 101 may perform an operation based on the received information. When receiving the sensing information, the electronic device 101 may identify the position information of the stylus pen 201 based on the sensing information, may identify the gesture corresponding to the position information, and may perform an operation corresponding to the gesture. When receiving the position information of the stylus pen 201, the electronic device 101 may identify the gesture corresponding to the position information, and may perform an operation corresponding to the gesture. For example, the stylus pen 201 may transmit information to the electronic device 101 until the input of the pen button is released. The electronic device 101 may identify the gesture based on the position information of the stylus pen 201, which has been identified until the release of the button input is detected. When the release of the button input is detected, the stylus pen 201 may deactivate the gyro sensor again. However, in various embodiments, the stylus pen 201 may activate both the gyro sensor and the acceleration sensor from the time at which removal is detected. In this case, the position information of the stylus pen 201 prior to the button input may be used to correct a gesture direction, and gesture recognition accuracy may be improved. For example, the electronic device 101 may identify the initial orientation information of the stylus pen 201, and may recognize a gesture using a displacement based on the initial orientation information.

Figure 6C:
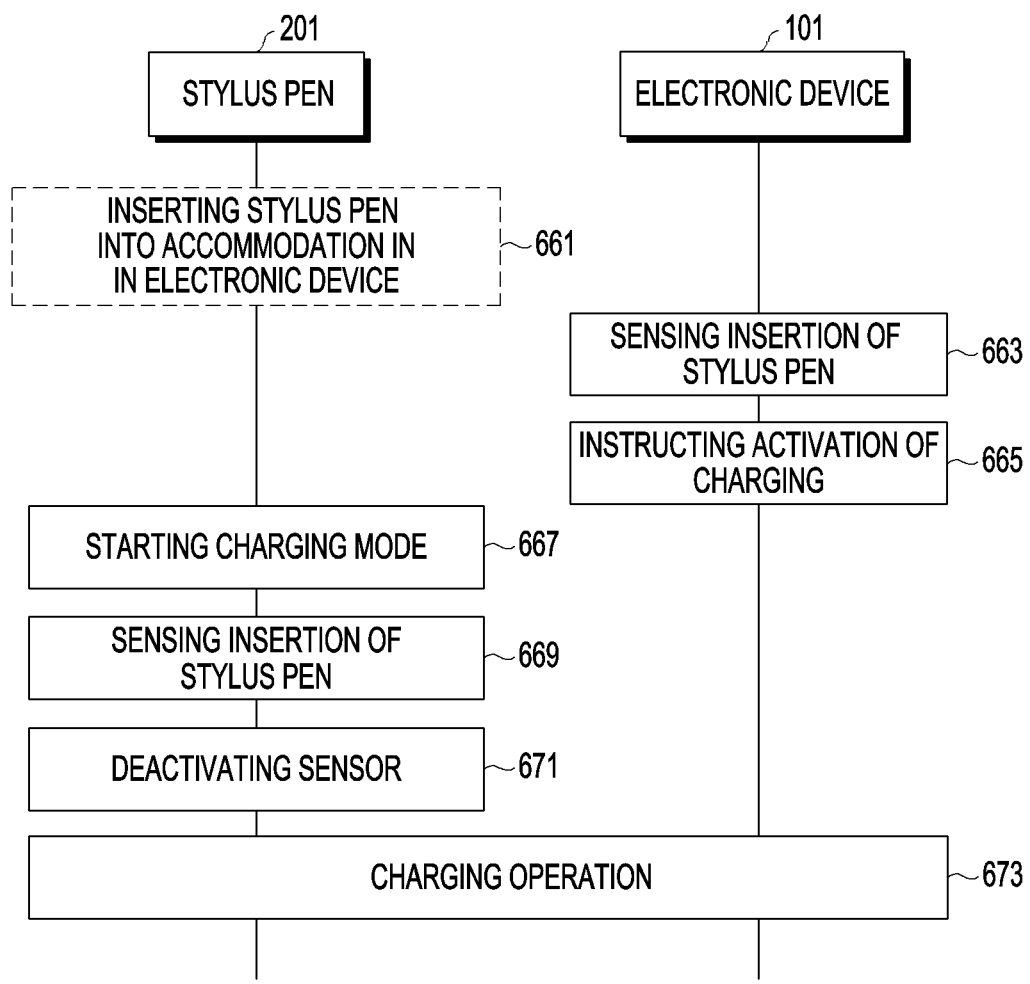
FIG. 6C is a view illustrating an operation of an electronic device and a stylus pen when the stylus pen is inserted into the electronic device according to an embodiment of the disclosure.

FIG. 6C is a view illustrating an operation of an electronic device and a stylus pen when the stylus pen is inserted into the electronic device according to an embodiment of the disclosure.

Referring to FIG. 6C, at operation 661, the stylus pen 201 may be inserted into the accommodation space in the electronic device 101. For example, the stylus pen 201 may be removed from the accommodation space after the initial insertion, and may then be reinserted. At operation 663, the electronic device 101 may detect the insertion of the stylus pen 201. At operation 665, the electronic device 101 may instruct the stylus pen 201 to activate charging. The electronic device 101 may instruct charging activation based on, for example, transmission of a signal having a pattern through an accommodation space coil or transmission of a communication signal through a communication module. At operation 667, the electronic device 101 may start a charging mode. At operation 669, the stylus pen 201 may detect the insertion of the stylus pen 201. The stylus pen 201 may identify whether it is inserted based on the information received from the electronic device 101 or the magnitude of the voltage applied to the resonance circuit (or the rectifier output terminal) of the stylus pen 201. At operation 671, the stylus pen 201 may deactivate sensors. The stylus pen 201 may deactivate some sensors, or may be set to omit sensor deactivation. At operation 673, the electronic device 101 and the stylus pen 201 may perform a charging operation. In various embodiments, the charging operation at operation 673 may be performed immediately after the start of the charging mode at operation 667, and there is no limitation as to the time of execution thereof.

Figure 7:
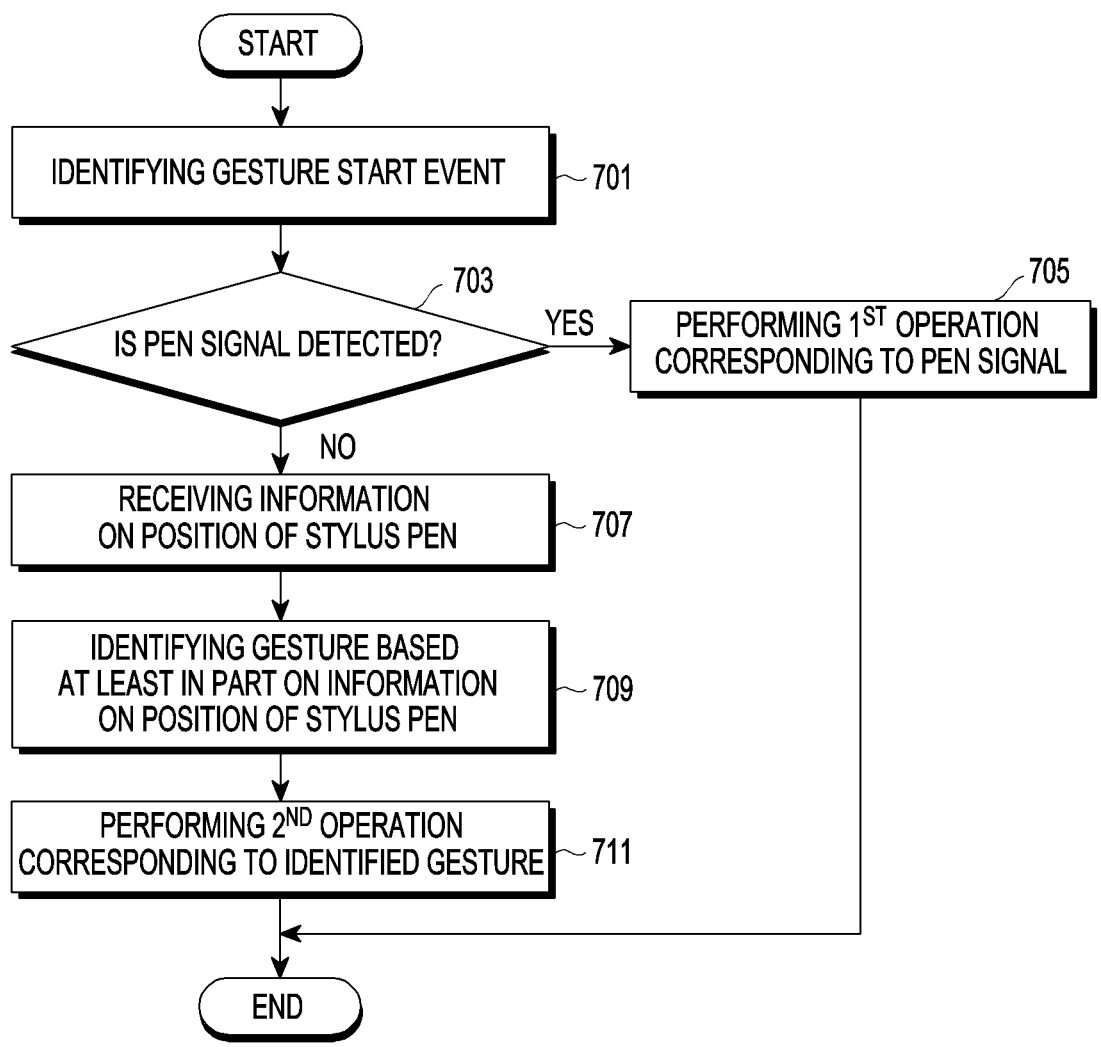
FIG. 7 is a flowchart illustrating a method of operating an electronic device according to an embodiment of the disclosure.

FIG. 7 is a flowchart illustrating a method of operating an electronic device according to an embodiment of the disclosure.

Referring to FIG. 7, at operation 701, the electronic device 101 may identify a gesture start event. For example, the electronic device 101 may identify a gesture start event based on information included in a communication signal from the stylus pen 201. The gesture start event may be, for example, detection of the pressed state of the button (e.g., the button 337) provided on the stylus pen 201. The button may be implemented as any one of a physical key, a touch key, a motion key, a pressure key, and a keyless scheme, and there is no limitation as to the implementation form thereof. After identifying the pressed state of the button, the stylus pen 201 may transmit a communication signal including information indicating the pressed state of the button to the electronic device 101.

According to various embodiments, at operation 703, the electronic device 101 may identify whether a pen signal is detected. For example, the electronic device 101 may receive an EMR signal by an EMR method or an ECR signal by an ECR method from the stylus pen 201. Alternatively, the electronic device 101 may identify an electrical signal generated by the stylus pen by an AES method. For example, the electronic device 101 may apply a transmission signal to a loop coil included in the sensing panel 503. After the transmission signal is applied, the electronic device 101 may identify that the pen signal is detected when the intensity of the signal output from the loop coil included in the sensing panel 503 is greater than or equal to a threshold intensity. The electronic device 101 may identify that the pen signal is not detected when the intensity of the signal output from the loop coil included in the sensing panel 503 is less than the threshold intensity. Alternatively, the electronic device 101 may perform detection of the stylus pen 201 or position detection of the stylus pen 201 by identifying a capacitance change due to the touch of the stylus pen on the touch sensing panel, which may also be expressed as detecting a pen signal. Alternatively, based on the detection of an electrical signal generated by the pen according to an AES method, the electronic device 101 may also perform detection of the stylus pen 201 or position detection of the stylus pen 201, which may also be expressed as detecting a pen signal.

According to various embodiments, when it is identified that the pen signal is detected (operation 703: Yes), the electronic device 101 may perform a first operation corresponding to the pen signal at operation 705. The electronic device 101 may identify the position of the stylus pen 201 on the electronic device 101 (e.g., the display device 160) based on the pen signal, and may perform a first operation corresponding to the identified position of the stylus pen 201. For example, the electronic device 101 may perform a function corresponding to an icon displayed on the display device 160. Alternatively, the electronic device 101 may display a drawing object on the display device 160 according to the movement of the stylus pen 201. The electronic device 101 may perform a function corresponding to the state in which the button of the pen is pressed, and there is no limitation as to the first operation. Alternatively, when the stylus pen 201 is located within a recognizable range, the electronic device 101 may control the drawing function. For example, the stylus pen 201 may detect a movement after activating the acceleration sensor, and may transmit the result of detection to the electronic device 101. In another example, information related to movement occurring when the side surface of the stylus pen 201 is touched may be transmitted to the electronic device 101. When the stylus pen 201 is implemented in a non-button type, information related to the movement occurring when the side surface is touched may be transmitted to the electronic device 101.

Based on the received information, the electronic device 101 according to various embodiments may provide at least one icon panel (e.g., consisting of icons capable of changing the pen function) related to a pen function (e.g., a thickness and/or a color), or may change the pen function (e.g., a thickness and/or a color). Alternatively, the electronic device 101 may display additional information on content being displayed through movement detected by the acceleration sensor of the stylus pen 201 (e.g., movement during the side surface touch input of the stylus pen) unlike the physical button input (a change of a pen signal frequency).

According to various embodiments, when no pen signal is detected (operation 703: No), the electronic device 101 may receive information on the position of the stylus pen 201 (e.g., information on motion sensor data, coordinates based on the motion sensor data, and/or a displacement based on the motion sensor data on the position of the stylus pen 201) at operation 707. The electronic device 101 may receive at least one communication signal from the stylus pen 201, and may identify information on the position of the stylus pen 201, included in each of one or more received communication signals. Information about the position of the stylus pen 201 may include the coordinates or displacement of the stylus pen 201. The electronic device 101 may identify time-series positions of the stylus pen 201. At operation 709, the electronic device 101 may check the gesture based at least in part on the information on the position of the stylus pen 201. Alternatively, the electronic device 101 may receive information on the position of the stylus pen 201 even when detecting a pen signal, but in this case, the signal may be ignored. At operation 711, the electronic device 101 may perform a second operation corresponding to the identified gesture. The second operation may be set to be different from the first operation. The electronic device 101 may map an operation corresponding to the gesture, and may identify and perform the mapped operation.

Figure 8A:
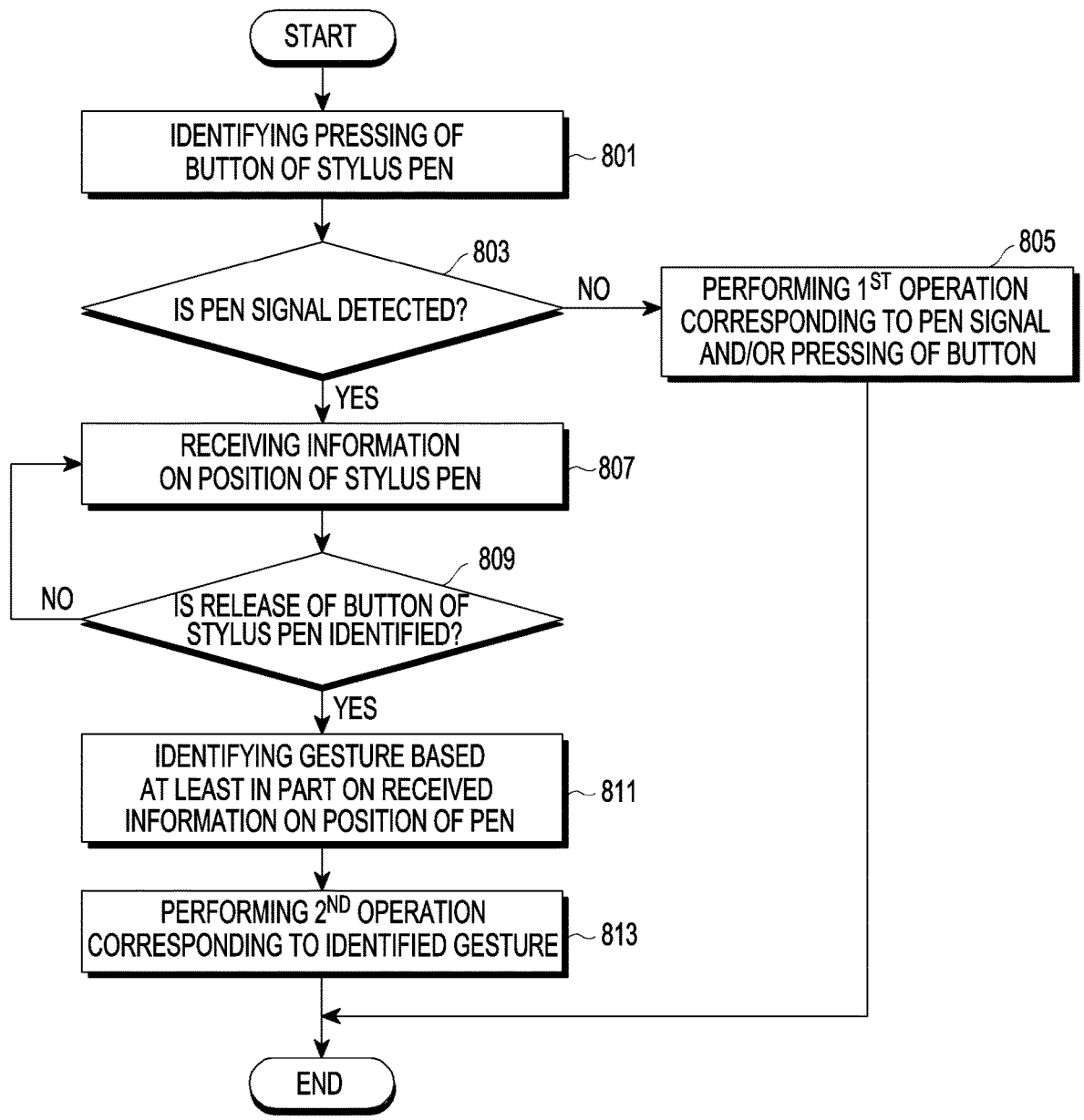
FIG. 8A is a flowchart for describing a method of operating an electronic device according to an embodiment of the disclosure.

FIG. 8A is a flowchart for describing a method of operating an electronic device according to an embodiment of the disclosure.

Referring to FIG. 8A, at operation 801, the electronic device 101 may identify that the button (e.g., the button 337) of the stylus pen 201 is pressed. The electronic device 101 may receive, from the stylus pen 201, a communication signal including information indicating the pressed state of the button. At operation 803, the electronic device 101 may identify whether a pen signal is detected. When it is identified that a pen signal is detected (operation 803: Yes), at operation 805, the electronic device 101 may perform a first operation corresponding to the pen signal and/or the pressing of the button. When it is identified that a pen signal is not detected (operation 803: No), at operation 807, the electronic device 101 may receive information on the position of the stylus pen 201. The electronic device 101 may identify information on time-series positions of the stylus pen 201.

According to various embodiments, at operation 809, the electronic device 101 may identify whether the button of the stylus pen 201 is released. When the button is released, the stylus pen 201 according to various embodiments may transmit a communication signal including information indicating the released state to the electronic device 101. When the release of the button is not identified (operation 809: No), the electronic device 101 may continue to receive information on the position of the stylus pen 201. Accordingly, the electronic device 101 may acquire information on the time-series positions of the stylus pen 201. When the release of the button is identified (operation 809: Yes), the electronic device 101 may identify the gesture, based at least in part on information on the position of the stylus pen 201, which is received at operation 811. At operation 813, the electronic device 101 may perform a second operation corresponding to the identified gesture. As described above, the electronic device 101 may identify the gesture using the information on the position during the period in which the button of the stylus pen 201 is pressed.

Figure 8B:
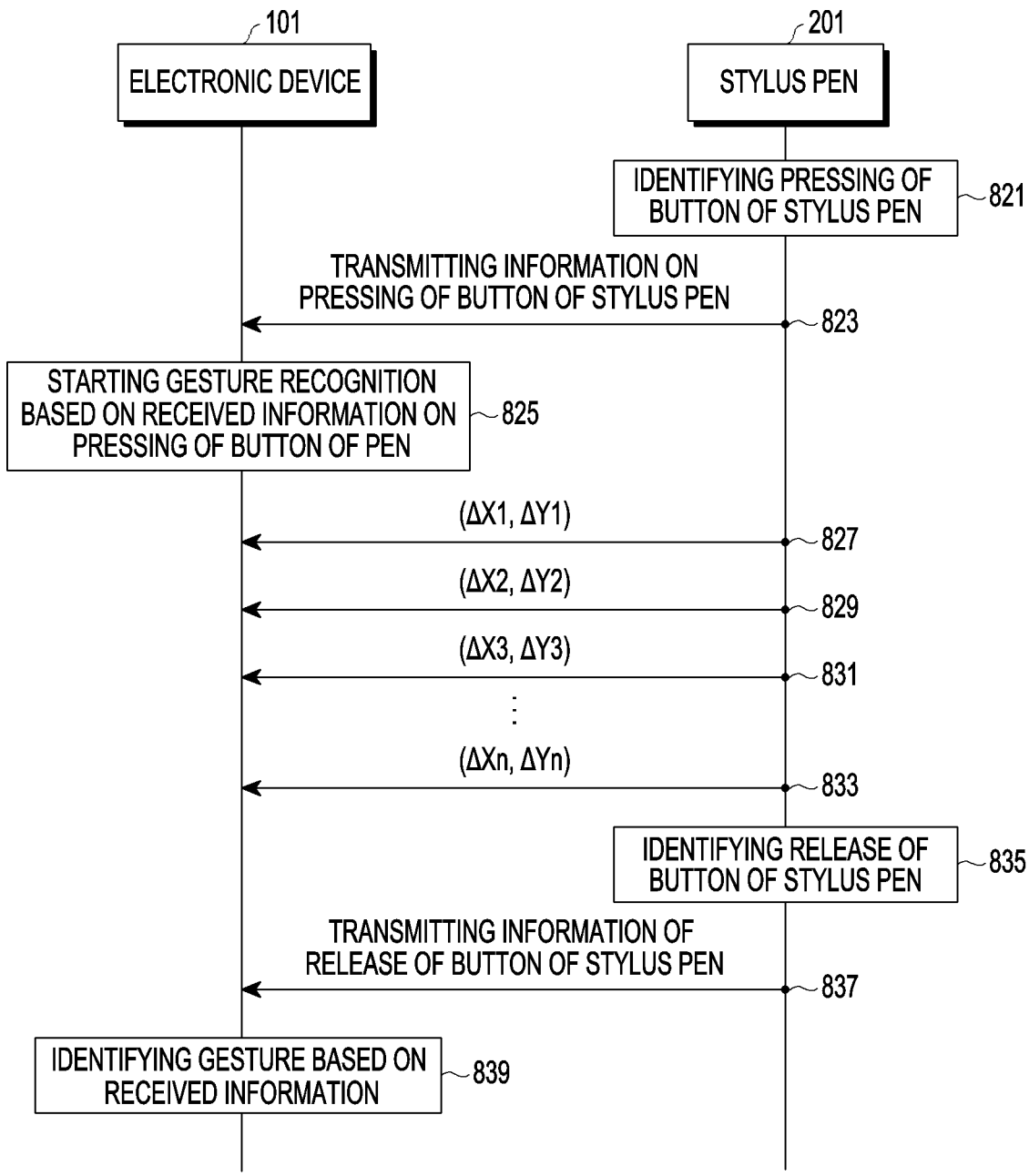
FIG. 8B is a flowchart for describing an operation of an electronic device and a stylus pen according to an embodiment of the disclosure.

FIG. 8B is a flowchart for describing the operation of an electronic device and a stylus pen according to an embodiment of the disclosure.

Referring to FIG. 8B, at operation 821, the stylus pen 201 may identify that the button (e.g., the button 337) of the stylus pen 201 is pressed. It is assumed that the stylus pen 201 has already established a communication connection with the electronic device 101. At operation 823, the stylus pen 201 may transmit a communication signal including information on the pressing of the button of the stylus pen. At operation 825, the electronic device 101 may start gesture recognition based on the received information on the pressing of the button of the pen. The stylus pen 201 may identify, for example, information on the displacement of the stylus pen 201 based on information sensed by the gyro sensor and the acceleration sensor. The stylus pen 201 may identify the displacement in a two-dimensional (or three-dimensional) coordinate system based on sensing information measured during a unit time. The stylus pen 201 may transmit a first displacement ($\Delta X1$, $\Delta Y1$) at operation 827, a second displacement ($\Delta X2$, $\Delta Y2$) at operation 829, a third displacement ($\Delta X3$, $\Delta Y3$) at operation 831, and an $n_{th}$ displacement ($\Delta Xn$, $\Delta Yn$) at operation 833. Based on the received displacements, the electronic device 101 may identify time-series positions of the stylus pen 201 in the coordinate system. For example, the electronic device 101 may identify the second position by applying (e.g., adding) the first displacement to the first position in the coordinate system. The electronic device 101 may identify a plurality of positions in the coordinate system by sequentially applying the displacements. At operation 835, the stylus pen 201 may detect the release of the button of the stylus pen 201. At operation 837, the stylus pen 201 may transmit information on the release of the button of the stylus pen 201 to the electronic device 101. The electronic device 101 may identify the gesture based on the information received at operation 839. The electronic device 101 may identify a gesture using a plurality of positions identified in the coordinate system. Detailed examples of gesture identification will be described later.

In the embodiment of FIG. 8B, although the stylus pen 201 is illustrated as transmitting information including displacement, this is merely an example. The stylus pen 201 may transmit sensing information to the electronic device 101 without change, or may transmit position information (e.g., coordinate values) to the electronic device 101. In addition, in FIG. 8B, information indicating the pressing or release of the button is illustrated as being transmitted in a communication signal different from the information associated with the position of the stylus pen 201. However, this is also merely an example, and these two pieces of information may be transmitted using one signal.

Figure 9:
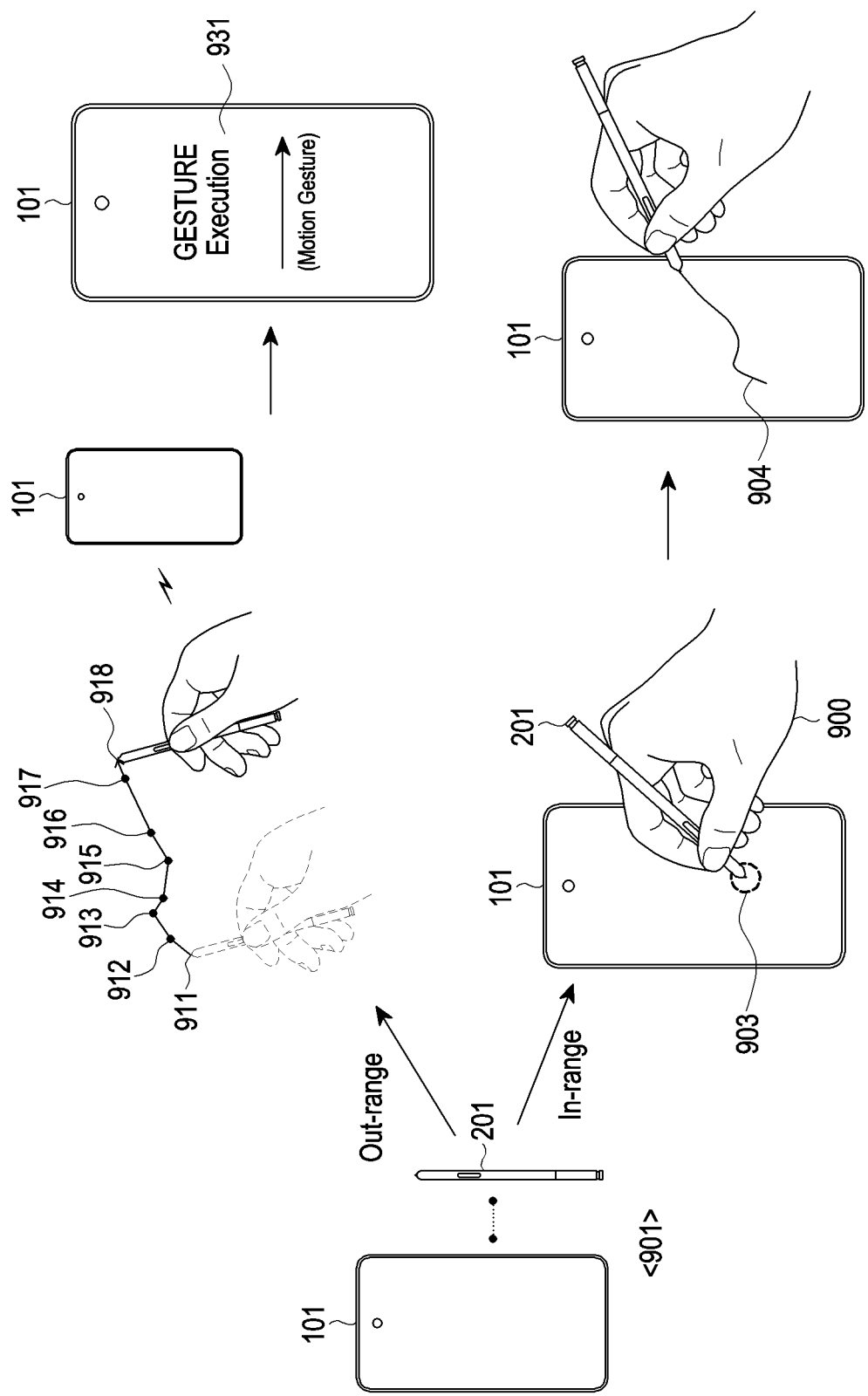
FIG. 9 is a view for describing an operation performed depending on a distance between an electronic device and a stylus pen according to an embodiment of the disclosure.

FIG. 9 is a view for describing an operation performed depending on the distance between an electronic device and a stylus pen according to an embodiment of the disclosure.

Referring to FIG. 9, at operation 901, the electronic device 101 and the stylus pen 201 may establish pairing (e.g., a communication connection). When the stylus pen 201 is located within a recognizable region of the electronic device 101, the electronic device 101 may detect a pen signal from the stylus pen 201. When the stylus pen 201 is located out of the recognizable region of the electronic device 101, the electronic device 101 may fail to detect a pen signal from the stylus pen 201.

When the stylus pen 201 is located out of the recognizable region of the electronic device 101, a user 900 may push the button 337 of the stylus pen 201. The user 900 may release the button 337 after moving the stylus pen 201 between the plurality of points 911, 912, 913, 914, 915, 916, 917, and 918 in the state of pressing the button 337. The stylus pen 201 may activate the gyro sensor and the acceleration sensor in the state in which the button is pressed, and may identify information on a position based on sensing data acquired by the activated sensors. For example, the stylus pen 201 may identify the coordinates of the stylus pen 201, and may transmit the coordinates to the electronic device 101. The electronic device 101 may identify a gesture (e.g., a gesture of moving to the right) based on the received coordinates of the stylus pen 201. The electronic device 101 may perform an operation corresponding to the gesture, and may display a screen 931 indicating the result of the operation. Depending on the implementation, the electronic device 101 may perform a function mapped to a gesture, or may perform a cursor movement in an air mouse mode. For example, when it is identified that the stylus pen 201 does not move while the button (e.g., the button 337) provided on the stylus pen 201 is maintained in the state of being pressed, the electronic device 101 may change modes from a gesture mode to an air mouse mode or vice versa. The electronic device 101 may perform a mode change in response to a long press of the button.

When the stylus pen 201 is located in the recognizable region of the electronic device 101, a user 900 may push the button 337 of the stylus pen 201. In addition, the user 900 may bring the stylus pen 201 into contact with a first point 903 of the electronic device 101. The user 900 may move the stylus pen 201 from the first point 903. The electronic device 101 may identify a time-series change in the position of the stylus pen 201 based on a pen signal from the stylus pen 201. Based on the position change, the electronic device 101 may display, for example, a screen 904 indicating a drawing result. The electronic device 101 may display a screen corresponding to a hovering function as well as one corresponding to the drawing result. Alternatively, when the stylus pen 201 is located within a recognizable range, the electronic device 101 may control the drawing function. For example, the stylus pen 201 may detect a movement after activating the acceleration sensor, and may transmit the result of the detection to the electronic device 101. In an example, the electronic device 101 may receive information on the movement of the pen that occurs when the side surface of the stylus pen 201 is touched. Based on the received information, the electronic device 101 may provide at least one icon panel (e.g., consisting of icons capable of changing the pen function) related to a pen function (e.g., a thickness and/or a color), or may change the pen function (e.g., a thickness and/or a color). Alternatively, the electronic device 101 may display additional information on content being displayed through a movement detected by the acceleration sensor of the stylus pen 201 (e.g., the side surface touch input of the stylus pen), unlike the physical button input (a change of a pen signal frequency).

Within the recognizable range, the electronic device 101 may activate a position gesture engine based on detection of a pen signal, and may perform an operation based on the position of the stylus pen, identified using the activated position gesture engine. For example, based on the pen signal identified in the recognizable range, the electronic device 101 may identify the position of the stylus pen 201, and may operate based on the identified position. In addition, the electronic device 101 may perform an additional operation using additionally received acceleration sensing information of the stylus pen 201, or may perform the operation identified using the identified position and the acceleration sensing information together. Additional operations may include, for example, providing at least one icon panel (e.g., consisting of icons that can change a pen function) associated with a pen function (e.g., a thickness and/or a color), changing a pen function (e.g., a thickness and/or a color), or display of additional information about the content being displayed. Based on the fact that no pen signal is detected outside the recognizable range, the electronic device 101 may activate the direction gesture engine, and may identify a gesture using the activated direction gesture engine. The direction gesture engine may include, for example, a circle gesture detector capable of detecting a circle gesture and a swipe gesture detector capable of detecting a swipe gesture, and there is no limitation as to the type of gesture or the type of detector for detecting the gesture. The detector will be described later.

Figure 10:
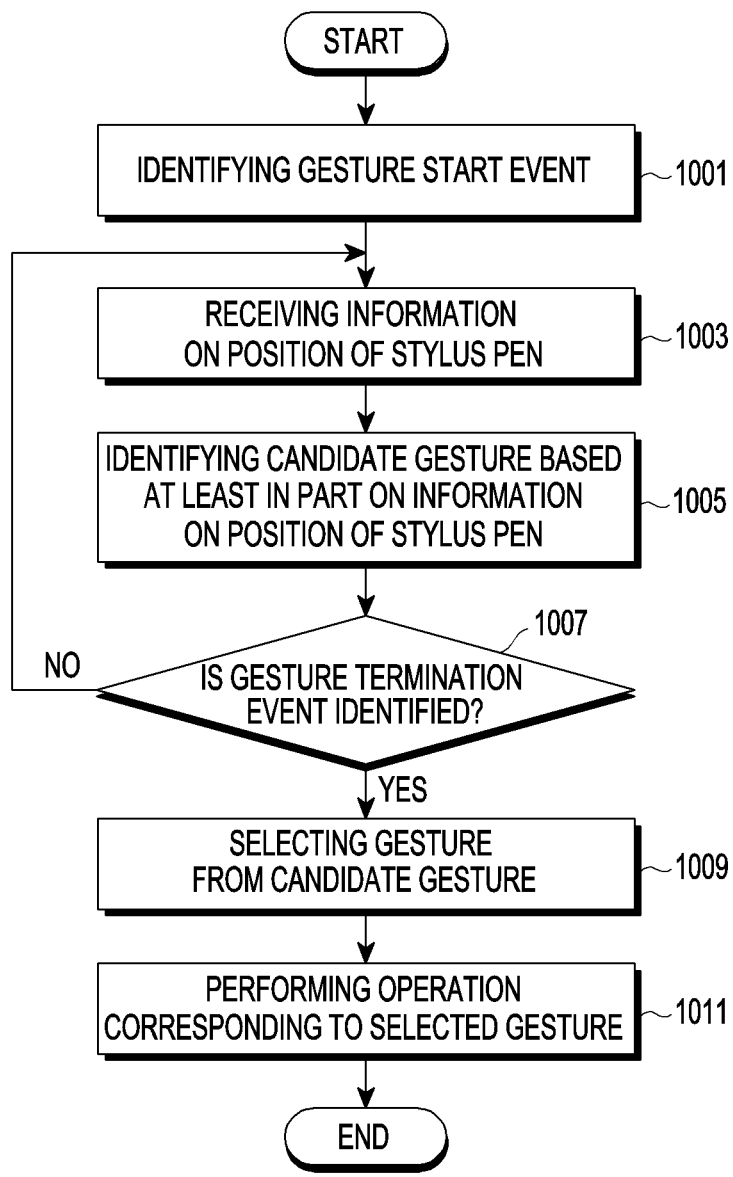
FIG. 10 is a flowchart illustrating a method of operating an electronic device according to an embodiment of the disclosure.

FIG. 10 is a flowchart illustrating a method of operating an electronic device according to an embodiment of the disclosure. The embodiment of FIG. 10 will be described with reference to FIG. 11.

Figure 11:
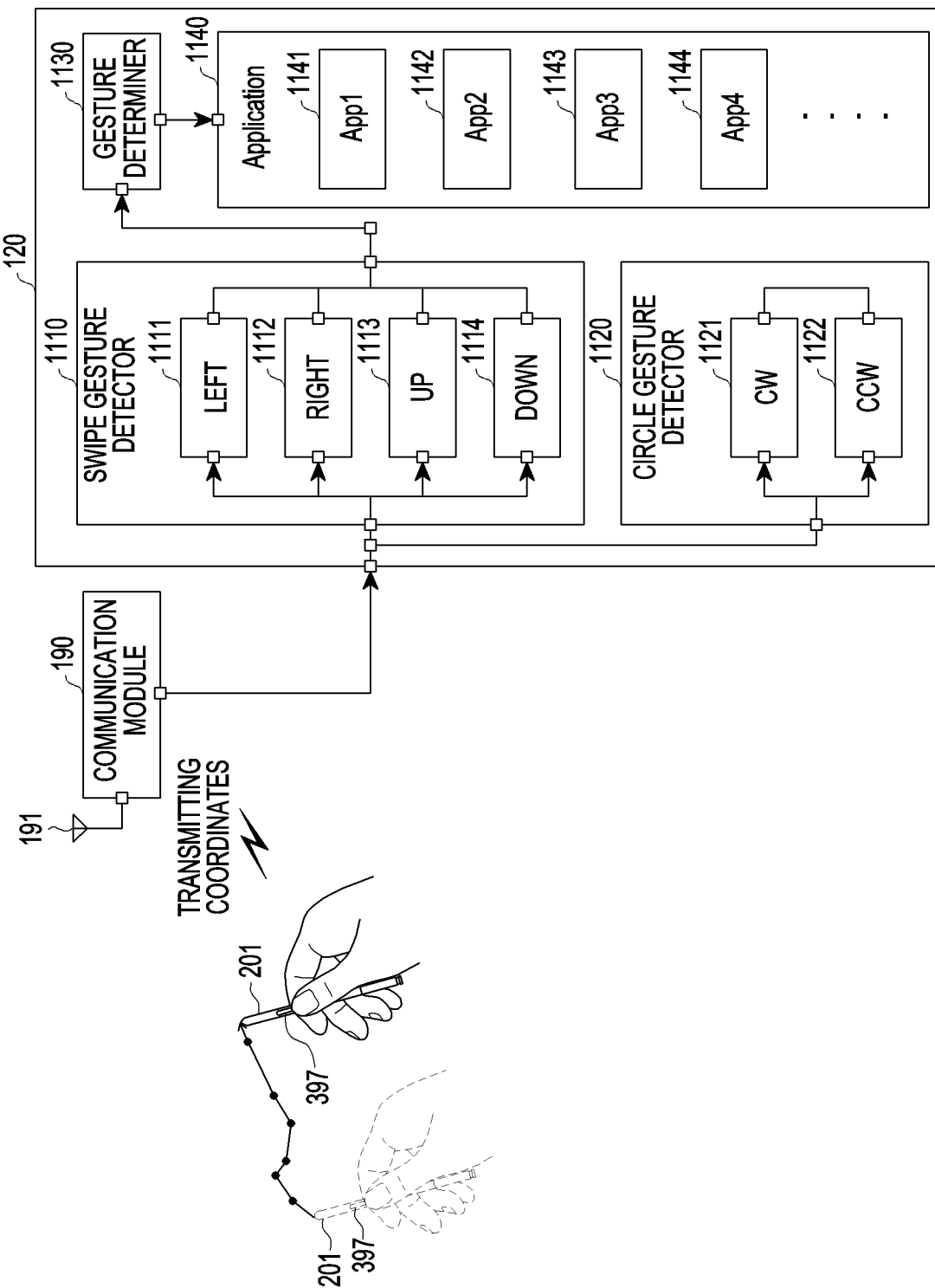
FIG. 11 is a view for describing a detector according to an embodiment of the disclosure.

FIG. 11 is a view for describing a detector according to an embodiment of the disclosure.

Referring to FIG. 10, at operation 1001, the electronic device 101 may identify a gesture start event. At operation 1003, the electronic device 101 may receive information on the position of the stylus pen. At operation 1005, the electronic device 101 may identify a candidate gesture based at least in part on the information on the position of the stylus pen.

Referring to FIG. 11, the electronic device 101 may receive coordinates from the stylus pen 201 via an antenna 191 and a communication module 190. The electronic device 101 may provide the received coordinates to a swipe gesture detector 1110 and a circle gesture detector 1120. When the electronic device 101 receives raw data or a displacement, the electronic device 101 may convert the data or displacement into coordinates, and may provide the coordinates to the detectors 1110 and 1120. The detectors may output a specific gesture based on the received coordinates using, for example, a determination algorithm executed by the processor 120. For example, the swipe gesture detector 1110 may output, as a candidate gesture, a leftward swipe gesture 1111, a rightward swipe gesture 1112, an upward swipe gesture 1113, or a downward swipe gesture 1114 based on the received coordinates. When there is no gesture that satisfies conditions, the swipe gesture detector 1110 may not output a gesture. Based on the received coordinates, the circle gesture detector 1120 may output, as a candidate gesture, at least one of a clockwise gesture 1121 or a counterclockwise gesture 1122. When there is no gesture that satisfies conditions, the circle gesture detector 1120 may not output a gesture. The detection algorithms of the swipe gesture detector 1110 and the circle gesture detector 1120 will be described later. The swipe gesture detector 1110 and the circle gesture detector 1120 may be executed at least simultaneously, but may be executed sequentially depending on the implementation. Alternatively, all of the detectors 1110 and 1120 may be executed, but only a detector corresponding to a gesture supported by an application executed in the foreground may be executed. In addition, a person ordinarily skilled in the art may understand that the type and number of detectors 1110 and 1120 are illustrative, and that there is no limit thereto.

According to various embodiments, at operation 1007, the electronic device 101 may identify whether a gesture termination event is detected. Before the gesture termination event is detected (operation 1007: No), the electronic device 101 may maintain the operation of identifying the candidate gesture. For example, the electronic device 101 may provide newly received coordinates to each of the detectors 1110 and 1120 while maintaining the execution of the detectors 1110 and 1120. When the termination event is detected (operation 1007: Yes), the electronic device 101 may select a gesture from among candidate gestures at operation 1009. For example, as illustrated in FIG. 11, the processor 120 may execute a gesture determiner 1130, and the gesture determiner 1130 may be an algorithm for selecting any one from one or more candidate gestures. In various embodiments, the electronic device 101 may operate in a manner of finally selecting any one of the one or more candidate gestures, or when a gesture termination event is identified when a candidate gesture is changed and managed in real time, the electronic device 101 may operate to select the candidate gesture as a gesture. There is no limitation as to the gesture selection method. At operation 1011, the electronic device 101 may perform a function corresponding to the selected gesture. For example, the electronic device 101 may transmit a gesture or a function execution command mapped to a gesture to any one of applications 1141, 1142, 1143, and 1144 included in the loaded application set 1140. The application to receive the gesture or the function execution command mapped to the gesture may be preset or selected as an application that is running in the foreground. Selection algorithms of the gesture determiner 1130 will be described in detail later. The functions mapped to gestures may be different for each application. Table 1 shows functions mapped to gestures for each application according to various embodiments.

Figure 12:
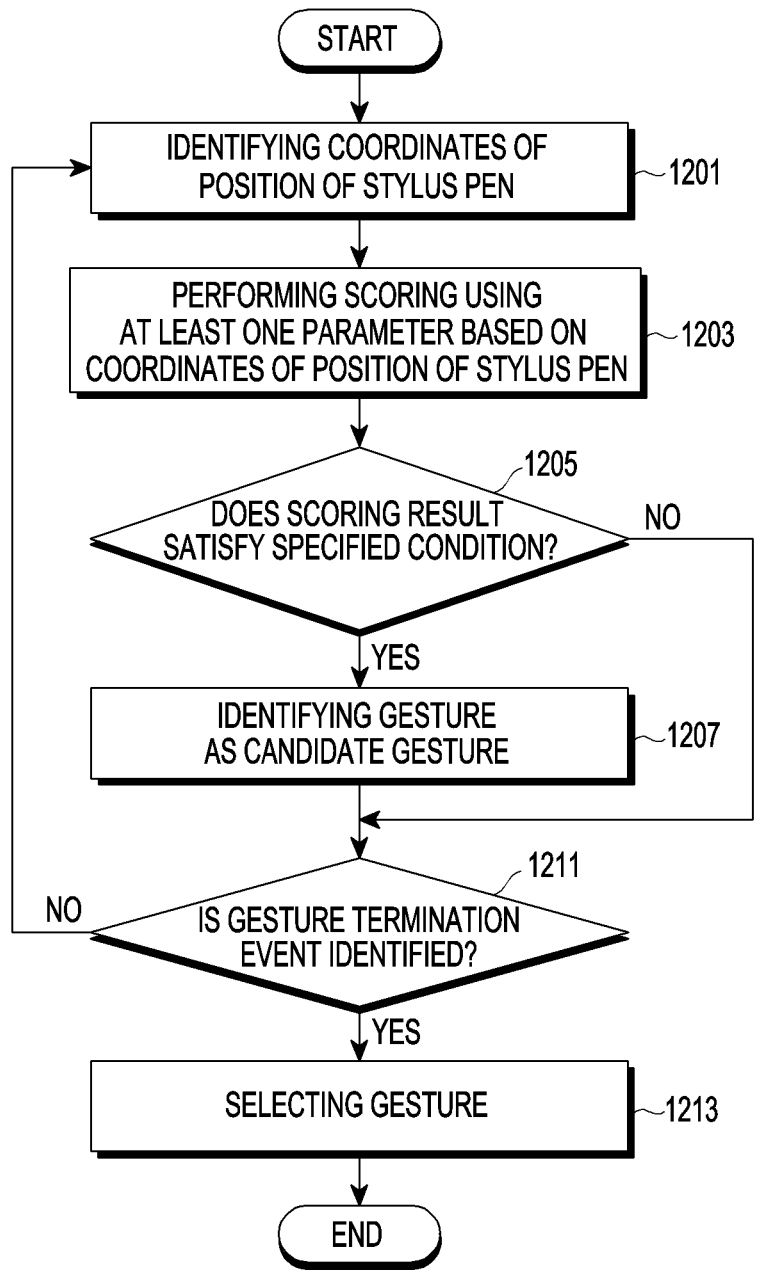
FIG. 12 is a flowchart illustrating a method of operating an electronic device according to an embodiment of the disclosure.

Referring to FIG. 12, at operation 1201, the electronic device 101 may identify the coordinates of the position of the stylus pen 201. At operation 1203, the electronic device 101 may execute scoring using at least one parameter based on the coordinates of the position of the stylus pen 201. For example, the electronic device 101 may identify, as parameters, the direction of a displacement between adjacent coordinates, the size of the displacement, and the direction and size of arbitrary coordinates with reference to a starting point, among all of the coordinates, and may perform scoring using the parameters. The parameters and scoring methods may be set differently for each detector. At operation 1205, the electronic device 101 may identify whether a scoring result satisfies a specified condition. When the specified condition is satisfied (operation 1205: Yes), the electronic device 101 may identify a candidate gesture at operation 1207. When the specified condition is not satisfied (operation 1205: No), the electronic device 101 may identify whether a gesture termination event is detected at operation 1211. For example, the electronic device 101 may identify a corresponding gesture, and may then perform calculations on coordinates continuously input thereafter. The electronic device 101 may store the identified gesture, and may then update a stored gesture to another gesture based on the continuously input coordinates. That is, the electronic device 101 may perform scoring until the specified condition is not satisfied for a specific gesture, and when an additional scoring result does not satisfy the specified condition, the electronic device 101 may determine that the corresponding gesture is not detected. As will be described later, the electronic device 101 may manage the corresponding gesture in a non-application state (e.g., a non-application state 1304 in FIG. 13). The electronic device 101 may identify a previously updated gesture as a candidate gesture.

TABLE 1

| Application | Upward/Downward Swipe Gesture | Leftward/Rightward Swipe Gesture | Clockwise/Counterclockwise Gesture |
|---|---|---|---|
| Camera Application | Before photographing: Switching front and rear cameras | Before photographing: mode switching; During imaging: N/A | During rear camera photographing: Zoom in/out |
| Gallery Application | Identifying detail/detail view | Identifying previous/next photo | Adding/removing favorites |
| Note Application | Scroll up/down | Switching mode tab | Handwrite text conversion/ cancellation |
| Internet Application | Scroll up/down | Identifying previous/next screen | Refresh |
| Music Application | Unset | Identifying previous/next track | Volume up/down |
| Video Application | Unset | Identifying previous/next track | Volume up/down |
| Office Application | Starting presentation | Moving page | Special function execution/termination |

Referring to Table 1, for a state (e.g., a state before imaging or a state during imaging) of one application (e.g., a camera application), the electronic device 101 may map different functions to gestures. Alternatively, for a specific application (e.g., a music application), a function may not be mapped to a specific gesture (e.g., an upward/downward swipe gesture).

FIG. 12 is a flowchart illustrating a method of operating an electronic device according to an embodiment of the disclosure.

According to various embodiments, at operation 1211, the electronic device 101 may identify whether a gesture termination event is detected. When a gesture termination event is not detected (operation 1211: No), the electronic device 101 may return to operation 1201 and may identify new coordinates of the stylus pen 201. The electronic device 101 may also perform scoring by identifying parameters for the new coordinates, and may determine whether to classify the corresponding gesture as a candidate gesture based on the result of the scoring. When the gesture termination event is detected (operation 1211: Yes), the electronic device 101 may select a candidate gesture as a gesture at operation 1213. As described above, when the coordinates are accumulated, a specific gesture may be classified as a candidate gesture and may then be managed as not being detected due to the additional coordinates.

Figure 13:
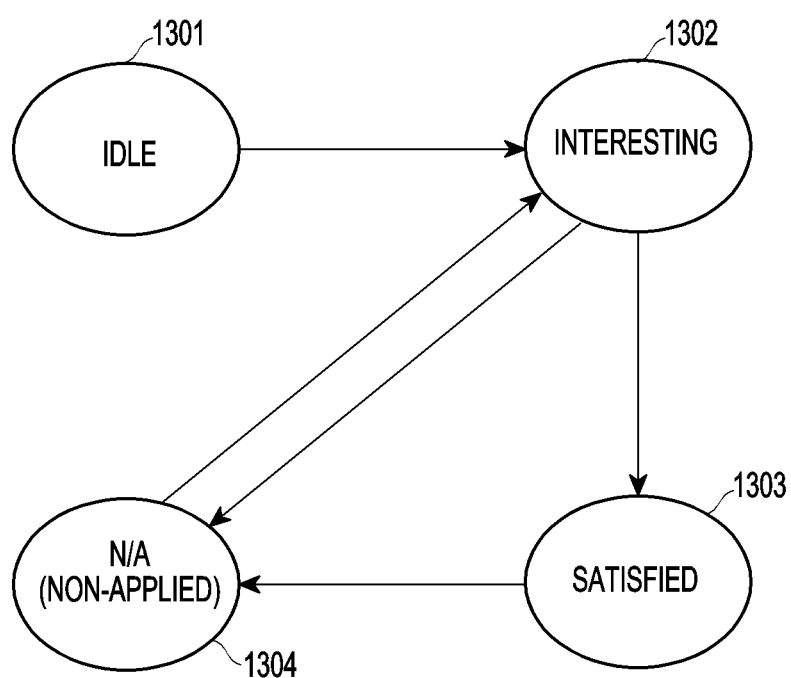
FIG. 13 is a diagram for describing switching between states set for candidate gesture determination according to an embodiment of the disclosure.

FIG. 13 is a diagram for describing switching between states set for candidate gesture determination according to an embodiment of the disclosure.

Referring to FIG. 13, the electronic device 101 may set an idle state 1301, an interesting state 1302, a satisfying state 1303, and a non-application (N/A) state 1304 in response to a specific gesture. The idle state 1301 may be a standby state for receiving coordinates when paired with the stylus pen 201. When the coordinates of the position are received from the stylus pen 201, the electronic device 101 may enter the interesting state 1302. In the interesting state 1302, the electronic device 101 may perform scoring using parameters identified from the coordinates. When the scoring result satisfies a specified condition, the electronic device 101 may identify the gesture corresponding to the satisfying state 1303, and may then continue to perform calculations on input coordinates. That is, the electronic device 101 may perform scoring until the specified condition is not satisfied. Meanwhile, when the scoring result in the interesting state 1302 does not satisfy the specified condition, the electronic device 101 may classify the corresponding gesture as the non-application state 1304. In addition, when the scoring result is not satisfied by the additional coordinates in the satisfying state 1303, the electronic device 101 may store the gesture that satisfies the previous scoring as a candidate gesture (last gesture), and may classify the corresponding gesture as the non-application state 1304. After entering the non-application state 1304, the electronic device 101 may enter the interesting state 1302 when coordinates are received again. Subsequently, when the specified condition is satisfied by performing scoring using a parameter identified from the continuously input coordinates, the electronic device 101 may enter the satisfying state 1303 for the corresponding gesture. After entering the satisfying state 1303, when the scoring is continued until the specified condition is not satisfied and thus the condition is not satisfied, the electronic device 101 may store the gesture that satisfies the previous scoring as a candidate gesture (ongoing gesture). In this case, the electronic device 101 may compare the lead distance (e.g., moving distance) of the ongoing gesture with that of the stored gestures (the last gesture), and may store the one having the longer lead distance as a candidate gesture. The comparison of parameters between the ongoing gesture and the last gesture may be referred to as parameter comparison between candidate gestures.

According to various embodiments, the electronic device 101 may select any one of the detected candidate gestures when detecting the termination event, rather than replacing and storing a candidate gesture in real time. For example, the electronic device 101 may identify at least one gesture detected before the termination event (e.g., button release), and may select any one of one or more gestures when the termination event is detected. A person ordinarily skilled in the art will understand that there is no limitation as to the method of determining a candidate gesture.

Figure 14:
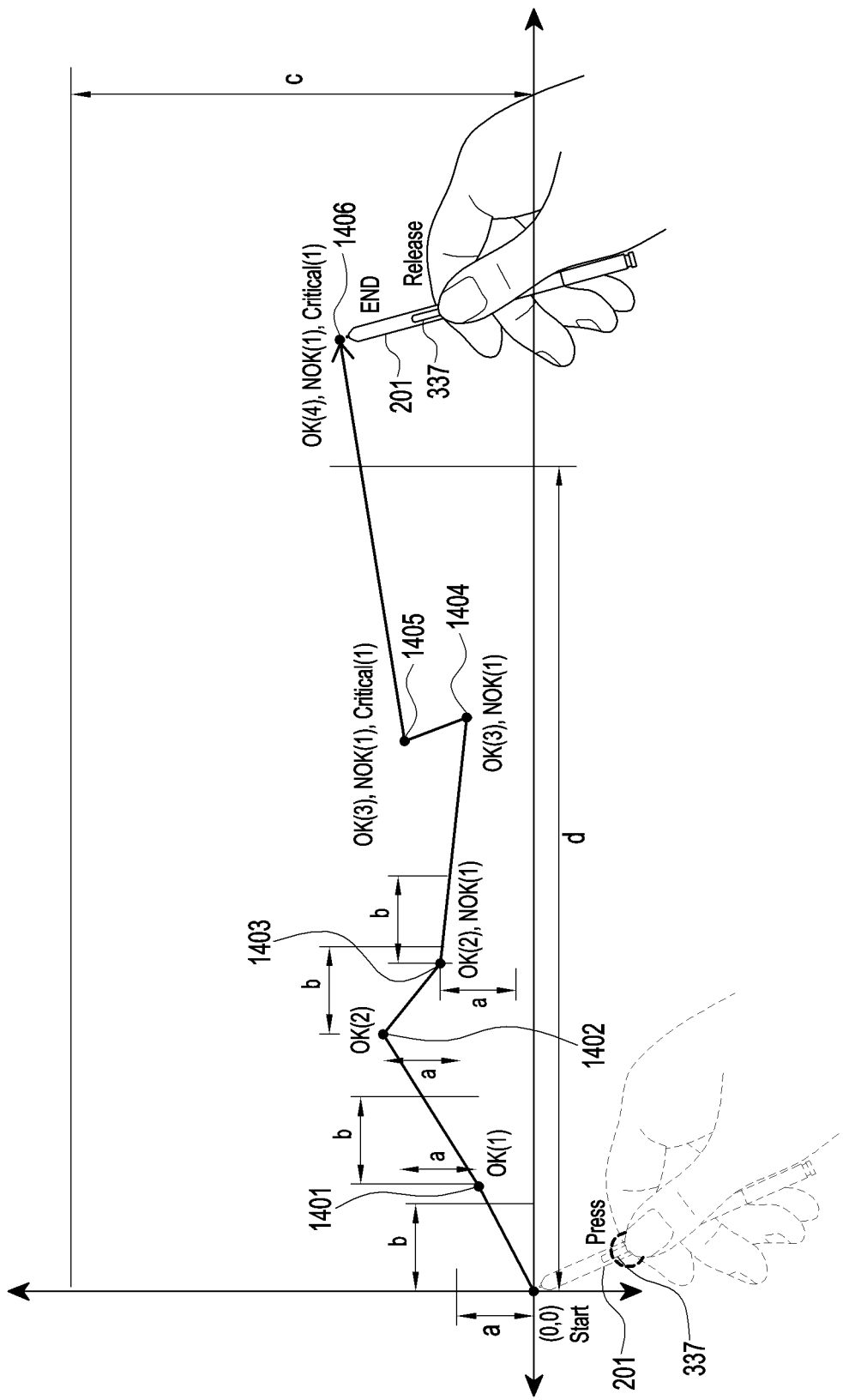
FIG. 14 is a view for describing a detection process performed by a swipe gesture detector according to an embodiment of the disclosure.

FIG. 14 is a view for describing a detection process performed by a swipe gesture detector according to an embodiment of the disclosure.

Table 2 shows a scoring method and determination criteria for each parameter corresponding to a swipe gesture according to various embodiments.

TABLE 2

| | |
|---|---|
| Limitation | a: permissible range during one movement in right-angle direction<br>b: minimum movement distance in travel direction<br>c: maximum permissible range in right-angle direction from starting point<br>d: minimum distance to be determined as gesture |
| NOK | 1. When moving more than "a" in right-angle direction in one movement [however, when moving distance in travel direction is larger than movement distance in right-angle direction, it is considered OK]<br>2. When moving less than "b" in the travel direction<br>3. When separated by "c" or more from starting point in right-angle direction [when movement distance in travel direction is larger than movement distance in right-angle direction, it is considered OK] |
| Critical | Move backward |
| OK | 1. Normal direction movement<br>2. Exception in condition Nos. 1 and 3 of NOK |
| Determination Criteria | 1. Number of Critical ones is 4 or less, and number of NOK ones is 10 or less<br>2. Number of OK ones in same direction is 2 or more, or movement distance is "d" or more |

Referring to FIG. 14, based on the scoring method of Table 2, scoring is performed for respective coordinates of FIG. 14. For example, the user may move the stylus pen 201 in the state of pressing the button 337 of the stylus pen 201. In the state in which the button 337 is pressed, the electronic device 101 may identify first coordinates 1401, second coordinates 1402, third coordinates 1403, fourth coordinates 1404, fifth coordinates 1405, and sixth coordinates 1406. With respect to the first coordinates 1401, it is identified that the stylus pen moves rightwards by "b" or more with reference to reference coordinates (0, 0). Thus, it can be identified that conditions of Nos. 1 and 2 of "NOK" are not satisfied and the conditions of "OK" are satisfied. Accordingly, the electronic device 101 may perform scoring to increase the number of OK ones by 1 with respect to the first coordinates 1401. With respect to the second coordinates 1402, it is identified that the stylus pen moves leftwards by "b" or more and moves in the right-angle direction by "a" or more. It can be identified that the condition of No. 1 of "NOK" is satisfied and the exception condition of No. 1 of "NOK" (when the moving distance in the travel direction is larger than the travel distance in the right-angle direction) is satisfied. Thus, the electronic device 101 may perform scoring of increasing the number of OK ones by 1 with respect to the second coordinates 1402. Through the above-described process, the electronic device 101 may perform scoring of increasing each of the numbers of NOK ones, OK ones, and Critical ones by 1 with respect to each of the third coordinates 1403, the fourth coordinates 1405, the fifth coordinates 1405, and the sixth coordinates 1406. In particular, with reference to the fourth coordinates 1404, it can be identified that the displacement in the x-axis direction of the fifth coordinates 1405 is made leftwards, and scoring may be performed to increase the number of Critical ones corresponding to reverse movement, by 1. The electronic device 101 may identify that the number of Critical ones is 4 as a threshold or less and that the number of NOK ones is 10 as a threshold or less. In addition, the electronic device 101 may identify that the movement distance in the right direction is d or more. Based on the fact that all of the conditions of Nos. 1 and 2 of "Determination Criteria" are satisfied, the electronic device 101 may identify that the gesture corresponding to the coordinates of the stylus pen 201 is a rightward swipe.

Figure 15:
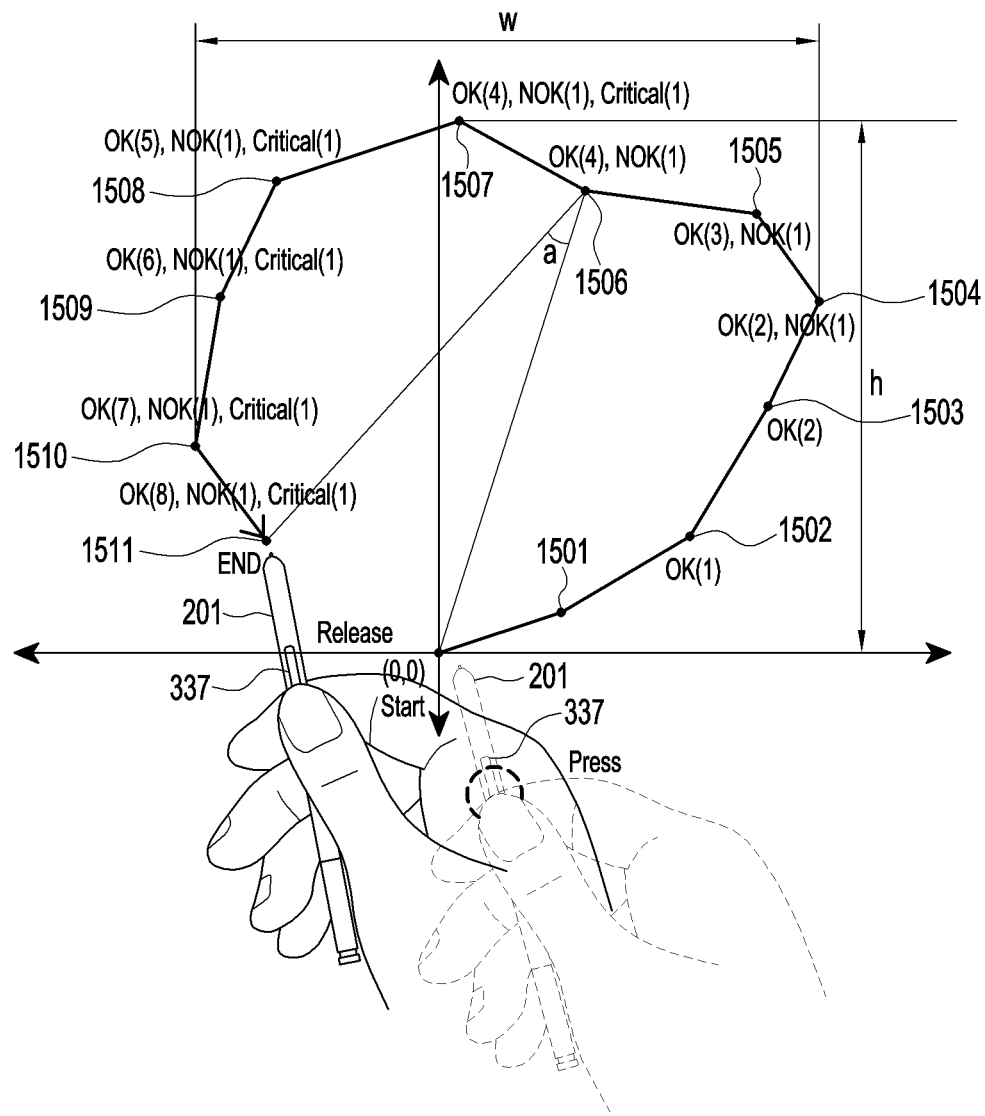
FIG. 15 is a view for describing a detection process performed by a circle gesture detector according to various embodiments of the disclosure.

FIG. 15 is a view for describing a detection process performed by a circle gesture detector according to an embodiment of the disclosure.

Table 3 shows a scoring method and determination criteria for each parameter corresponding to a circle gesture according to various embodiments.

TABLE 3

| | |
|---|---|
| Limitation | a: Angle formed by start point/center point/termination point |
| | w: Width of gesture |
| | h: Height of gesture |
| NOK | When three adjacent sets of coordinates form a straight line |
| Critical | Rotation in opposite directions (angles formed by three adjacent sets of coordinates are formed in opposite directions) |
| OK | Normal movement in travel direction |
| Determination Criteria | 1. Number of Critical ones is 3 or less, and number of NOK ones is 5 or less |
| | 2. Number of OK ones in same direction is 6 or more |
| | 3. w/h is 0.35 or more or h/w is 0.35 or more |
| | 4. a <90 degrees |
| | When all of items 1 to 4 are satisfied, it is recognized as a circle gesture |

Referring to FIG. 15, based on the scoring method of Table 3, scoring is performed for respective coordinates of FIG. 15. For example, the user may move the stylus pen 201 in the state of pressing the button 337 of the stylus pen 201. In the state in which the button 337 is pressed, the electronic device 101 may identify first coordinates 1501, second coordinates 1502, third coordinates 1503, fourth coordinates 1504, fifth coordinates 1505, sixth coordinates 1506, seventh coordinates 1507, eighth coordinates 1508, ninth coordinates 1509, tenth coordinates 1510, and eleventh coordinates 1511. It can be identified that the angle formed by the reference coordinates (0,0), the first coordinates 1501, and the second coordinates 1502 is formed counterclockwise, does not satisfy conditions of "NOK" in Table 3, and satisfies the conditions of "OK". The electronic device 101 may perform scoring to increase the number of OK ones by 1 with respect to the second coordinates 1502. Meanwhile, the electronic device 101 may identify that the angle formed by the second coordinates 1502, the third coordinates 1503, and the fourth coordinates 1504 is a straight line, and accordingly, and may perform scoring to increase the number of NOK ones by 1 with respect to the fourth coordinates 1504. Meanwhile, the electronic device 101 may identify that the angle formed by the fifth coordinates 1505, the sixth coordinates 1506, and the seventh coordinates 1507 corresponds to the clockwise direction, and may perform scoring to increase the number of Critical ones by 1 with respect to the seventh coordinates 1507. The electronic device 101 may sequentially score up to the eleventh coordinates 1511, and may identify OK (8), NOK (1), and Critical (1) as a cumulative scoring result. The electronic device 101 may identify that the corresponding scoring result satisfies the conditions of Nos. 1 and 2 of "Determination Criteria" of Table 3. In addition, the electronic device 101 may identify w, which is the maximum deviation in the x-axis direction of all of the coordinates, and h, which is the maximum deviation in the y-axis direction of all of the coordinates, and may confirm that both w/h and h/w are 0.35 or more. Accordingly, the electronic device 3 may identify that the condition of No. 3 of "Determination Criteria" is satisfied. The electronic device 101 may identify that the angle a formed between the reference coordinates (0,0) as the starting point, the sixth coordinates 1506 as the intermediate point, and the eleventh coordinates 1511 as the termination point is less than 90 degrees, and thus may identify that the condition of No. 4 of "Determination Criteria" is satisfied. Based on the fact that conditions of Nos. 1 to 4 of "Determination Criteria" are satisfied, the electronic device 101 may identify that the gesture is a counterclockwise circle gesture.

Meanwhile, the conditions of Tables 2 and 3 described above are merely illustrative, and may be modified. In addition, the electronic device 101 may apply different scoring methods and determination conditions depending the state of the electronic device 101 or a user. For example, different scoring methods and determination conditions may be applied to the case where the electronic device 101 is in a stationary state, the case where a user of the electronic device is in a walking state, and the case where a user of the electronic device is in a running state, respectively. In addition, the electronic device 101 may adjust the scoring method and the determination conditions based on the gesture habit of each user, and may apply the adjusted scoring method and determination conditions later.

Figure 16:
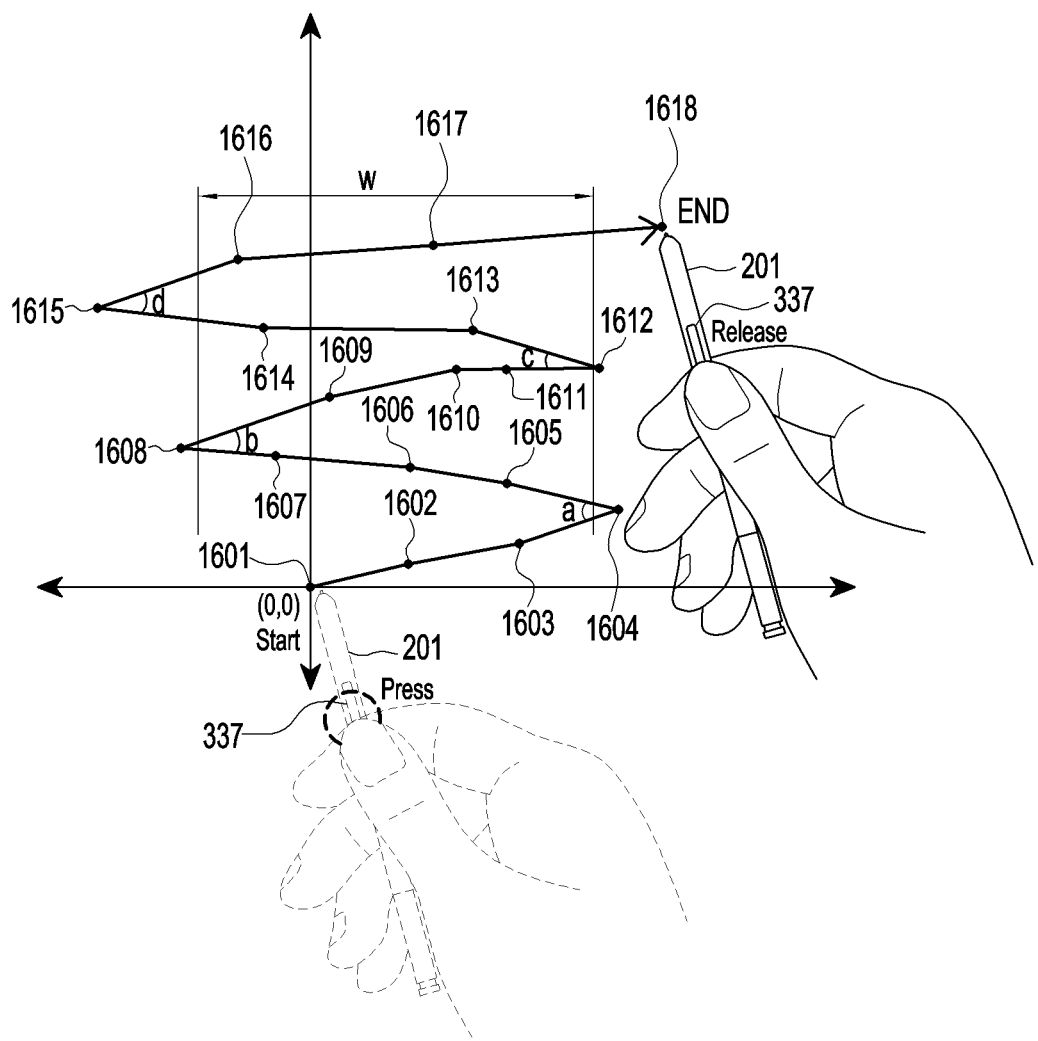
FIG. 16 is a view for describing a detection process performed by a shake gesture detector according to an embodiment of the disclosure.

FIG. 16 is a view for describing a detection process performed by a shake gesture detector according to an embodiment of the disclosure.

Referring to FIG. 16, according to various embodiments based on information on the position of the button 337 of the stylus pen 201 in the state in which the button 337 is pressed, the electronic device 101 may identify first coordinates 1601, second coordinates 1602, third coordinates 1603, fourth coordinates 1604, fifth coordinates 1605, sixth coordinates 1606, seventh coordinates 1607, eighth coordinates 1608, ninth coordinates 1609, tenth coordinates 1610, eleventh coordinates 1611, twelfth coordinates 1612, thirteenth coordinates 1613, fourteenth coordinates 1614, fifteenth coordinates 1615, sixteenth coordinates 1616, seventeenth coordinates 1617, and eighteenth coordinates 1618. The electronic device 101 may identify that there are three or more cases in which three angles (e.g., a, b, c, and d) formed by three adjacent sets of coordinates are 90 degrees or less. The electronic device 101 may identify that a deviation between center points of angles of 90 degrees or less (e.g., the fourth coordinates 1604, the eighth coordinates 1608, the twelfth coordinates 1612, and the fifteenth coordinates 1615) is greater than w. The electronic device 101 may identify that the type of gesture is a shake gesture based on satisfaction of the above conditions. Meanwhile, a person ordinarily skilled in the art will understand that the above-described criteria for determining the shake gesture is merely illustrative, and can also be modified.

Figure 17:
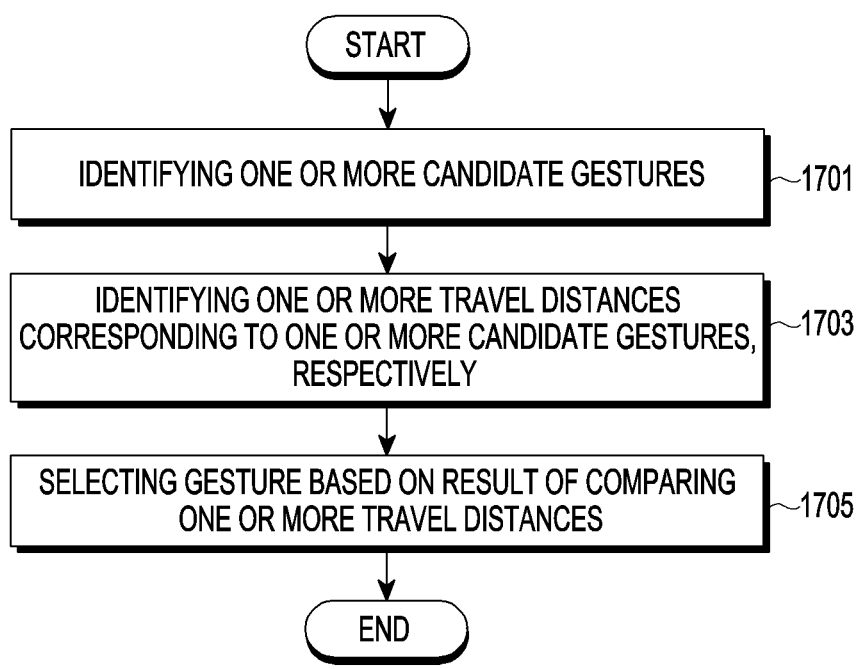
FIG. 17 is a flowchart illustrating a method of operating an electronic device according to an embodiment of the disclosure.

FIG. 17 is a flowchart illustrating a method of operating an electronic device according to an embodiment of the disclosure. The embodiment of FIG. 17 will be described with reference to FIG. 18.

Figure 18:
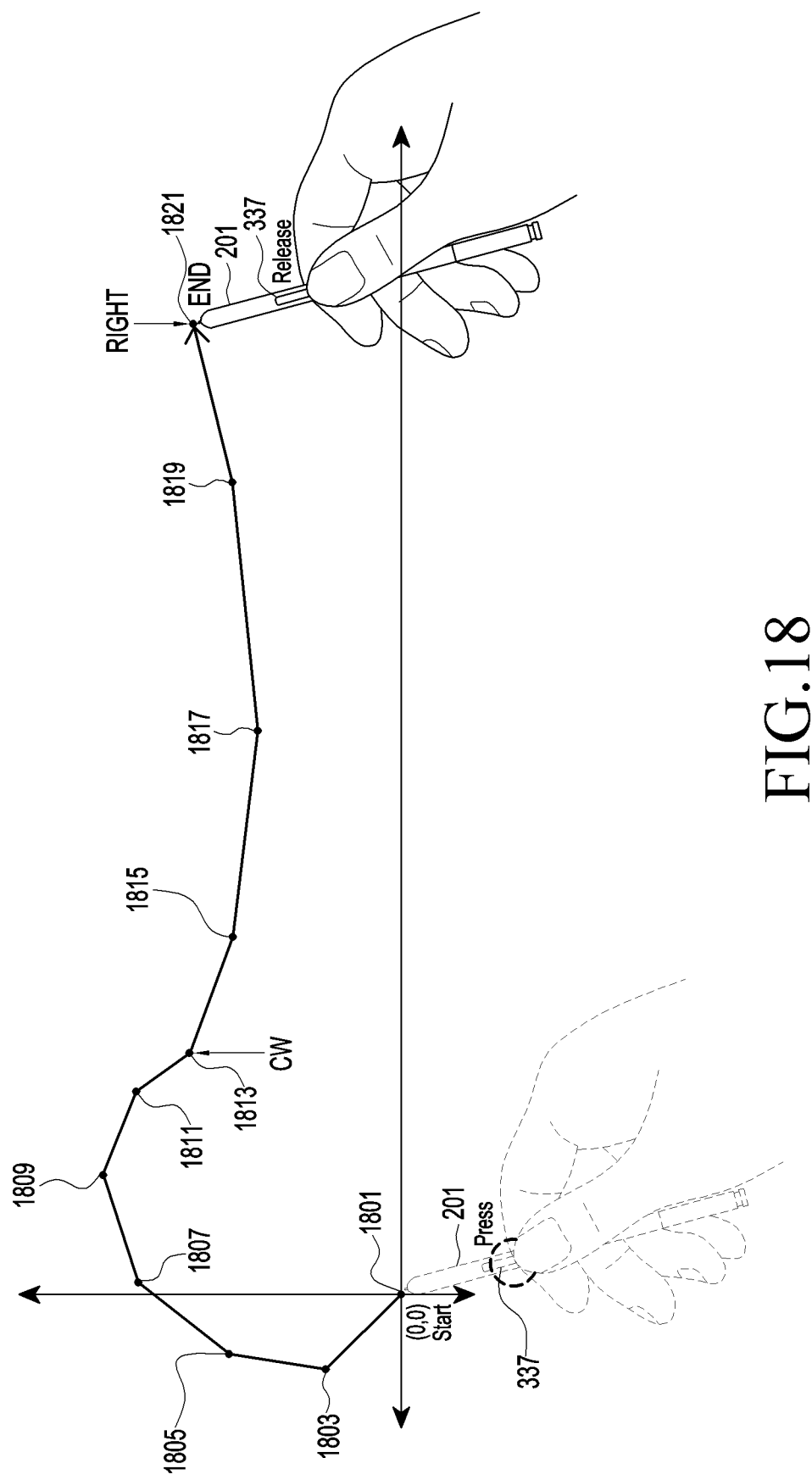
FIG. 18 is a view illustrating movement of a stylus pen according to an embodiment of the disclosure.

FIG. 18 is a view illustrating movement of a stylus pen according to an embodiment of the disclosure.

Referring to FIG. 17, at operation 1701, the electronic device 101 may identify at least one candidate gesture. For example, the electronic device 101 may identify a plurality of time-series coordinates of the stylus pen 201. The electronic device 101 may input the plurality of identified coordinates to a plurality of gesture detectors (or detection algorithms). When the scoring result satisfies the specified determination conditions, the gesture detector may output the corresponding gesture, and the electronic device 101 may identify at least one candidate gesture.

Referring to FIG. 18, according to the movement of the stylus pen 201 in the state in which the button 337 is pressed, the electronic device 101 may identify first coordinates 1801, second coordinates 1803, third coordinates 1805, fourth coordinates 1807, fifth coordinates 1809, sixth coordinates 1811, seventh coordinates 1813, eighth coordinates 1815, ninth coordinates 1817, tenth coordinates 1819, and eleventh coordinates 1821. The electronic device 101 may input the first coordinates 1801 to eleventh coordinates 1821 into the circle gesture detector, and may identify the clockwise circle gesture as a candidate gesture. The electronic device 101 may input the first coordinates 1801 to eleventh coordinates 1821 into the swipe gesture detector, and may identify the rightward swipe gesture as a candidate gesture.

According to various embodiments, at operation 1703, the electronic device 101 may identify at least one travel distance corresponding to each of the one or more candidate gestures. For example, the electronic device 101 may confirm that the travel distance of the clockwise circle gesture is "a" and that the travel distance of the rightward swipe gesture is "b". At operation 1705, the electronic device 101 may select a gesture based on the result of comparing one or more travel distances. For example, the electronic device 101 may select a gesture having the longest travel distance among candidate gestures based on a simple comparison of the travel distances. Alternatively, the electronic device 101 may weight travel distances and may select a gesture based on the result of comparing the weighted travel distances. For example, the electronic device 101 may be set to give a higher weight to a gesture detected sequentially later. According to various embodiments, the electronic device 101 may select a gesture among candidate gestures based on the scoring result used in the gesture detection process. For example, the gesture having the best scoring result may be selected. In addition, the electronic device 101 may be set to perform gesture processing when the corresponding gesture occupies 50% or more of the total travel distance.

Figure 19:
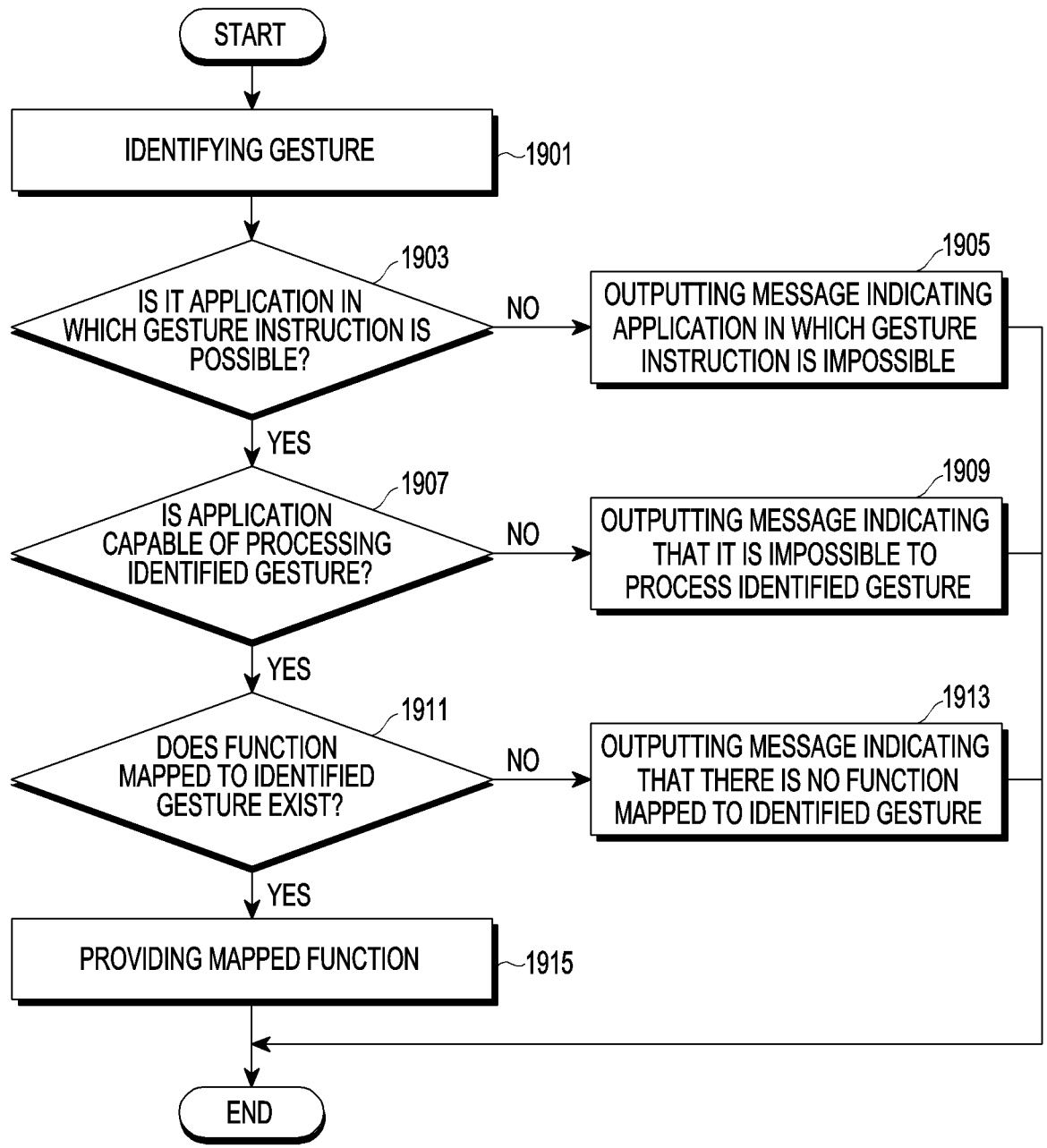
FIG. 19 is a flowchart illustrating a method of operating an electronic device according to an embodiment of the disclosure.

FIG. 19 is a flowchart illustrating a method of operating an electronic device according to an embodiment of the disclosure.

Referring to FIG. 19, at operation 1901, the electronic device 101 may identify a gesture. At operation 1903, the electronic device 101 may identify whether an application is an application in which a gesture command is possible. For example, the electronic device 101 may identify whether an application that is being executed in the foreground is an application in which a gesture command is possible. In the case where the application is an application in which a gesture command is impossible (operation 1903: No), at operation 1905, the electronic device 101 may output a message indicating an application in which a gesture command is not possible. When the application is an application in which a gesture command is possible (operation 1903: Yes), at operation 1907, the electronic device 101 may identify whether the application is capable of processing the identified gesture. When it is identified that the application is not capable of processing the identified gesture (operation 1907: No), at operation 1909, the electronic device 101 may output a message indicating that it is impossible to process the identified gesture. When it is identified that the application is capable of processing the identified gesture (operation 1907: Yes), at operation 1911, the electronic device 101 may identify whether there is a function mapped to the identified gesture. When there is no function mapped to the identified gesture (operation 1911: No), at operation 1913, the electronic device 101 may output a message indicating that there is no function mapped to the identified gesture. When there is a function mapped to the identified gesture (operation 1911: Yes), at operation 1915, the electronic device 101 may provide the mapped function. According to various embodiments, for example, when a gesture that is not defined is detected a specified number of times or more (e.g., twice), the electronic device 101 may display a screen providing a gesture guide.

Figure 20A:
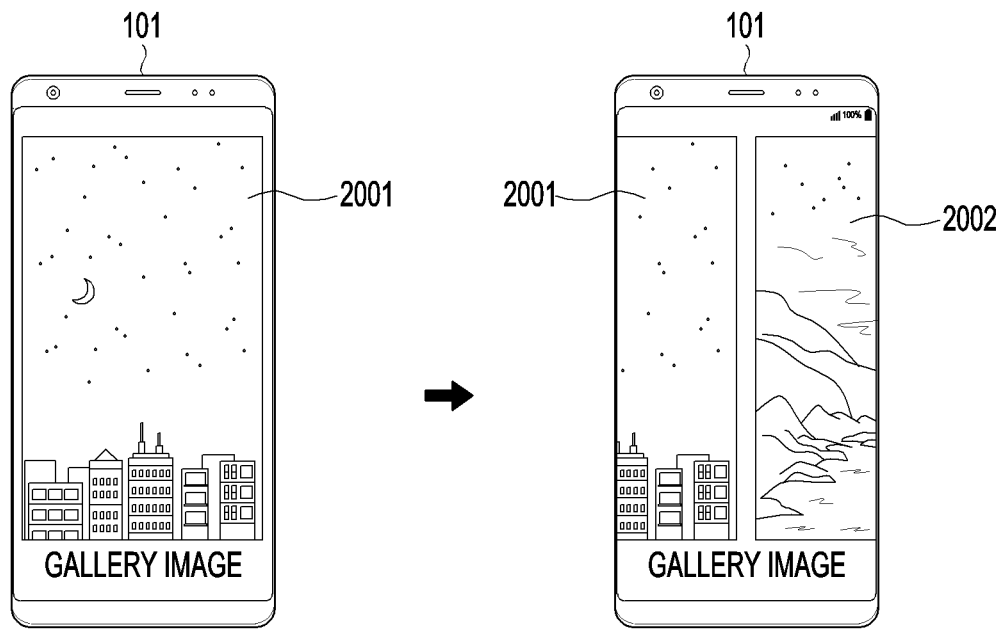
FIG. 20A is a view illustrating an electronic device performing an operation corresponding to a gesture according to an embodiment of the disclosure.
Figure 20A:
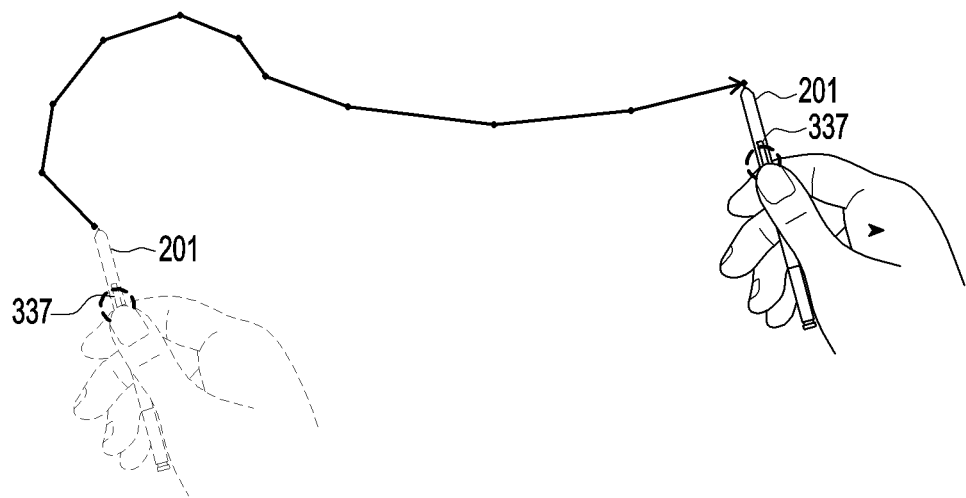

FIG. 20A is a view illustrating an electronic device performing an operation corresponding to a gesture according to an embodiment of the disclosure.

Referring to FIG. 20A, the electronic device 101 according to various embodiments may receive information on a plurality of positions of the stylus pen 201 according to the movement of the stylus pen 201 in the state in which the button 337 is pressed. The electronic device 101 may identify a circle gesture and a swipe gesture as candidate gestures, and may finally select the swipe gesture. The electronic device 101 may identify that the function mapped to the swipe gesture in the gallery application is gallery image switching. Accordingly, the electronic device 101 may switch from a first image 2001, which is an execution screen of a gallery application, to a screen including at least a portion of the first image 2001 and at least a portion of a second image 2002, and may display the screen including at least a portion of the first image 2001 and at least a portion of the second image 2002. Although not illustrated, the electronic device 101 may then display the entire second image 2002, and accordingly, image switching may be performed.

Figure 20B:
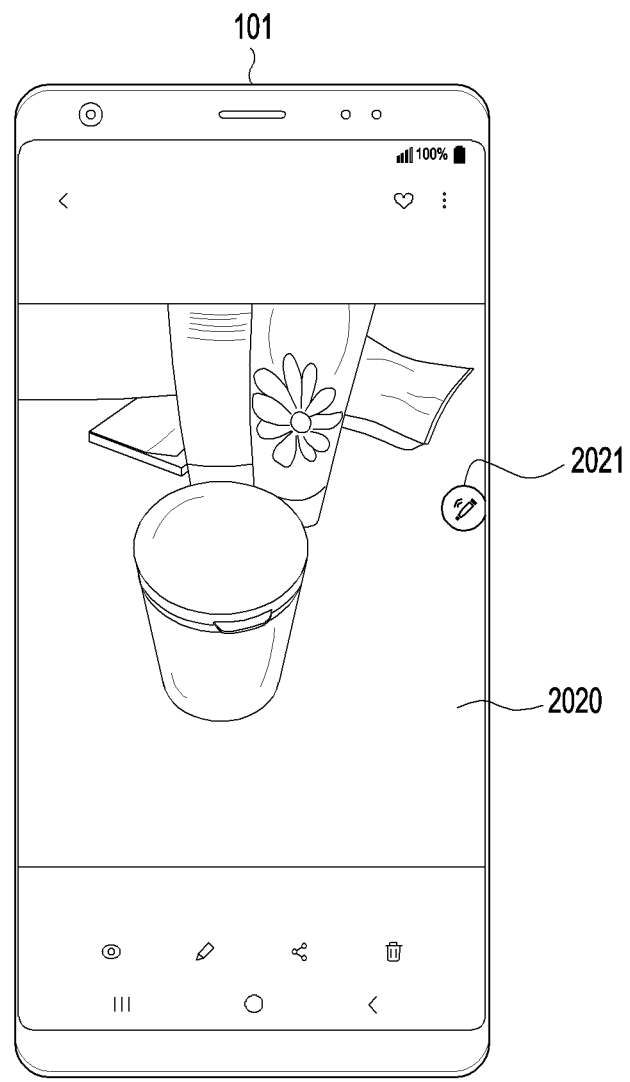
FIG. 20B is a view illustrating a screen displayed by an electronic device according to an embodiment of the disclosure.

FIG. 20B is a view illustrating a screen displayed by an electronic device according to an embodiment of the disclosure.

Figure 20C:
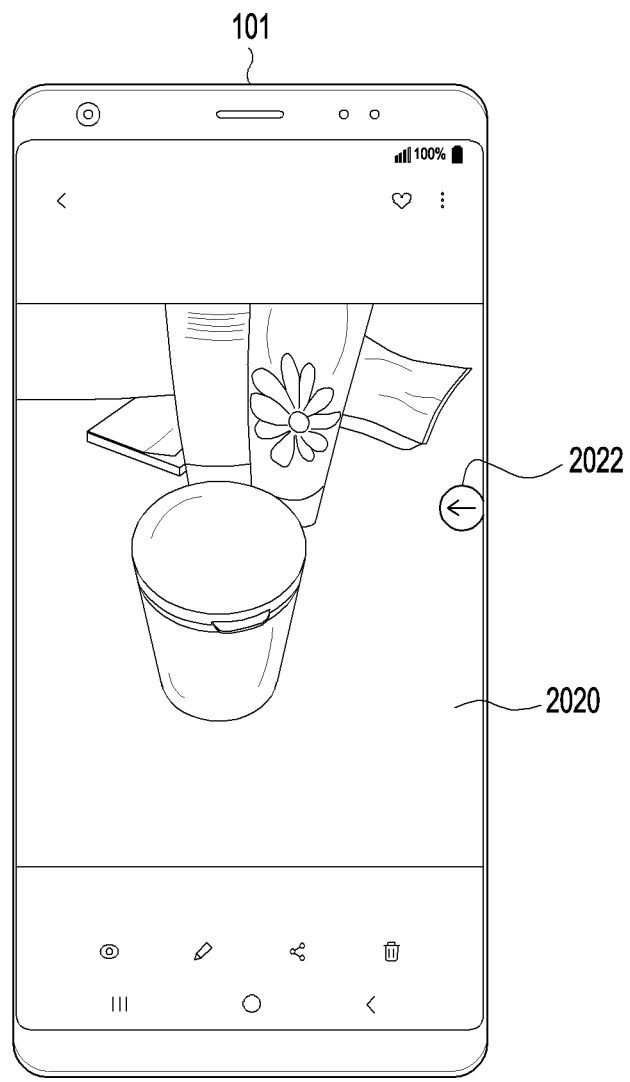
FIG. 20C is a view illustrating a screen displayed by an electronic device according to an embodiment of the disclosure.

FIG. 20C is a view illustrating a screen displayed by an electronic device according to an embodiment of the disclosure.

Figure 20D:
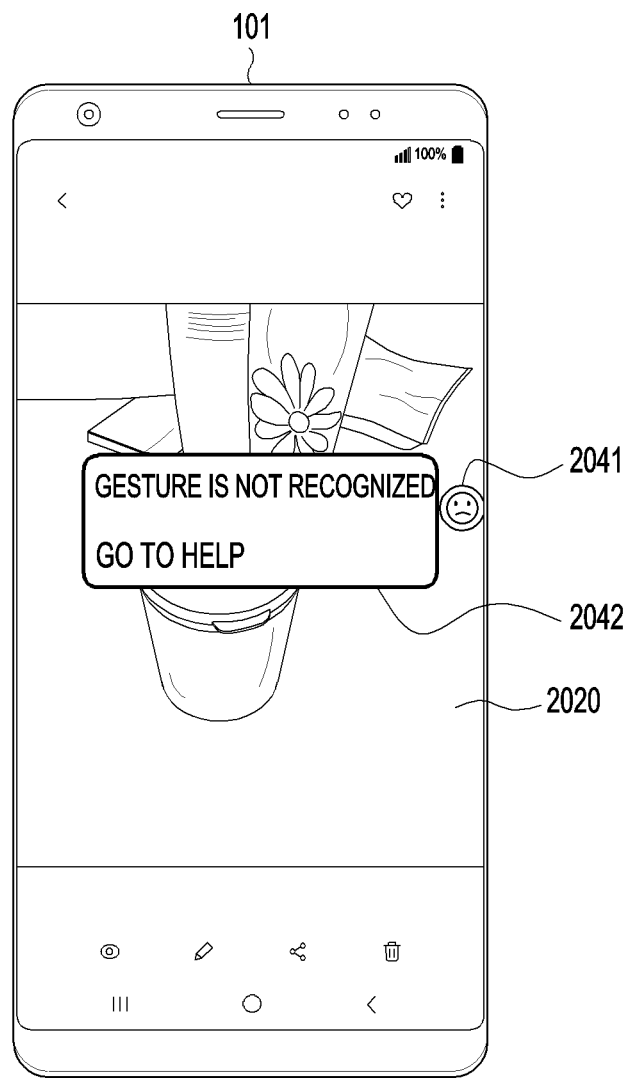
FIG. 20D is a view illustrating a screen displayed by an electronic device according to an embodiment of the disclosure.

FIG. 20D is a view illustrating a screen displayed by an electronic device according to an embodiment of the disclosure.

Figure 20E:
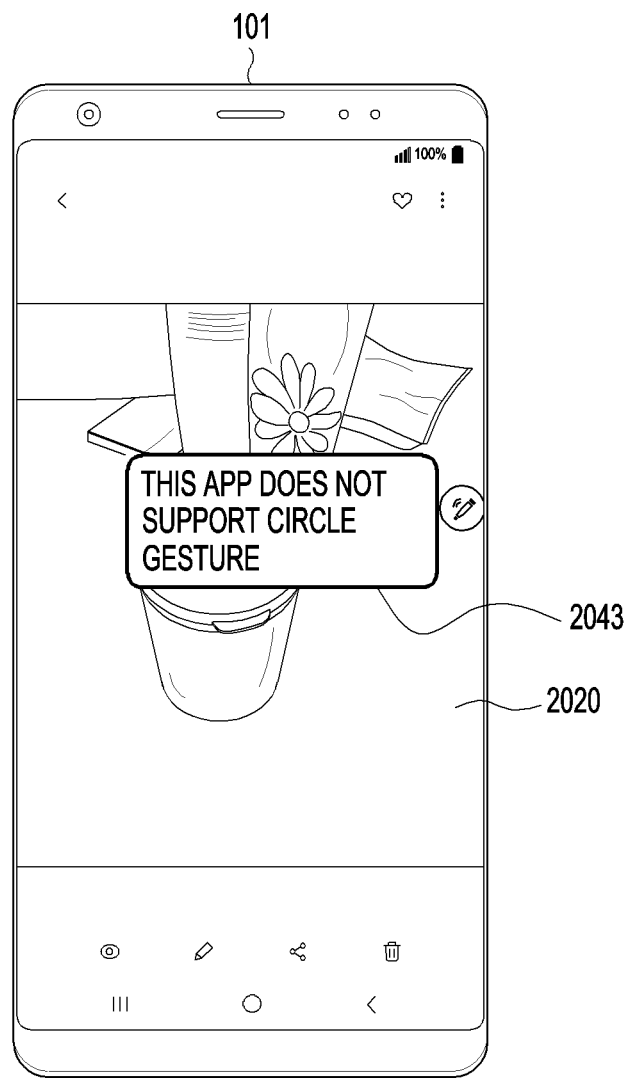
FIG. 20E is a view illustrating a screen displayed by an electronic device according to an embodiment of the disclosure.

FIG. 20E is a view illustrating a screen displayed by an electronic device according to an embodiment of the disclosure.

Figure 20F:
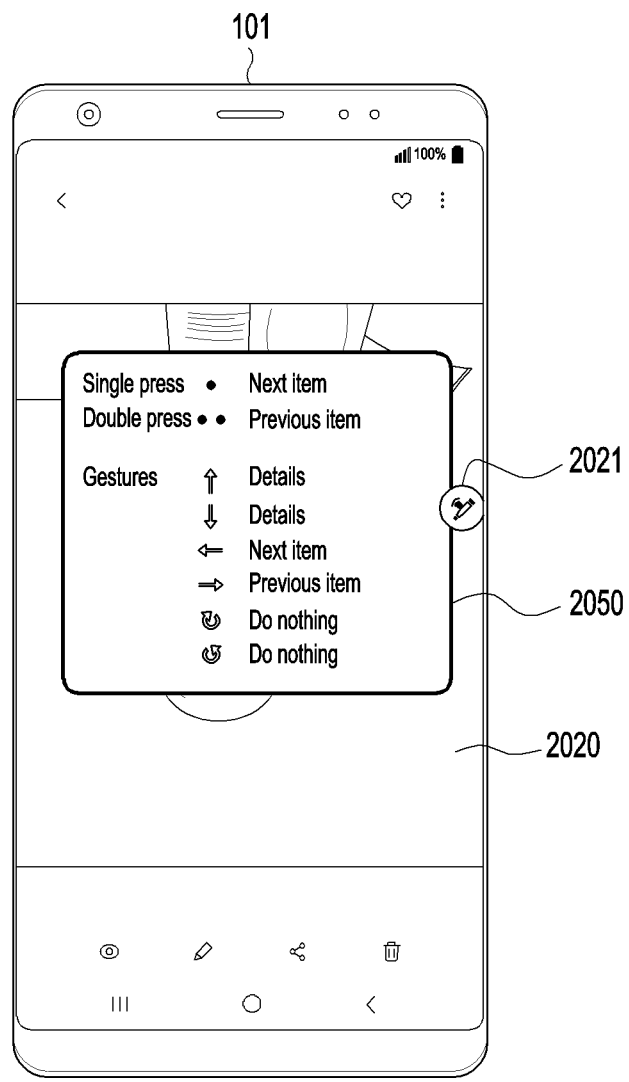
FIG. 20F is a view illustrating a screen displayed by an electronic device according to an embodiment of the disclosure.

FIG. 20F is a view illustrating a screen displayed by an electronic device according to an embodiment of the disclosure.

Referring to FIG. 20B, the electronic device 101 according to various embodiments may display a first icon 2021 on an application execution screen 2020. The electronic device 101 may display the first icon 2021 on the application execution screen 2020 based on the execution of an application (e.g., a gallery application) that supports gesture control and/or button control by the stylus pen 201. The first icon 2021 may indicate that control by the stylus pen 201 is possible.

Referring to FIG. 20C, the electronic device 101 according to various embodiments may display a second icon 2022 on the application execution screen 2020. For example, the electronic device 101 may identify a gesture, and may display a second icon 2022 corresponding to the identified gesture. In the embodiment of FIG. 20C, it is illustrated that the electronic device 101 displays the second icon 2022 corresponding to the leftward swipe gesture based on confirmation of the leftward swipe gesture, but this is merely illustrative. The electronic device 101 may display icons that correspond to various identified gestures, respectively. The electronic device 101 may perform a function corresponding to a gesture. When a predetermined time is exceeded or an operation corresponding to the gesture is completed, the electronic device 101 may change the second icon 2022 to the first icon 2021, and may display the first icon 2021.

Referring to FIG. 20D, the electronic device 101 according to various embodiments may display a third icon 2041 on the application execution screen 2020. The electronic device 101 may display the third icon 2041 when gesture recognition fails. For example, when gesture recognition failure is identified a threshold number of times (e.g., 3 times), the electronic device 101 may display the third icon 2041. However, the threshold number of times is not limited. The electronic device 101 may display a message window 2042 indicating that recognition of the gesture has failed and inquiring whether to switch to an application state for providing help. When selection of the message window 2042 is identified, the electronic device 101 may provide a screen (e.g., screen 2102 in FIG. 21) providing a description of supported gestures.

Referring to FIG. 20E, the electronic device 101 according to various embodiments may display a message window 2043 indicating that a gesture is not supported, on the application execution screen 2020. For example, the gallery application of the electronic device 101 may be set to provide functions corresponding to a leftward swipe gesture, a rightward swipe gesture, an upward swipe gesture, and a downward swipe gesture. When the electronic device 101 recognizes a circle gesture, the electronic device 101 may identify that there is no function mapped to the recognized gesture in the application (e.g., an application, which is running in the foreground). In response thereto, the electronic device 101 may display a message window 2043 indicating that the recognized gesture is not supported.

Referring to FIG. 20F, the electronic device 101 according to various embodiments may display a message window 2050 for describing the function mapped to the gesture on the application execution screen 2020. For example, the message window 2050 may include information indicating that it is possible to provide detailed items in response to an upward swipe gesture and a downward swipe gesture, that it is possible to provide the next item in response to a leftward swipe gesture, and that it is possible to provide the previous item in response to a rightward swipe gesture. The message window 2050 may include information indicating that no function is mapped to the clockwise circle gesture or the counterclockwise circle gesture. For example, the electronic device 101 may display the message window 2050 based on the detection of a hovering event for the icon 2021. However, a person ordinarily skilled in the art will understand that there is no limit on the calling event of the message window 2050.

Figure 21:
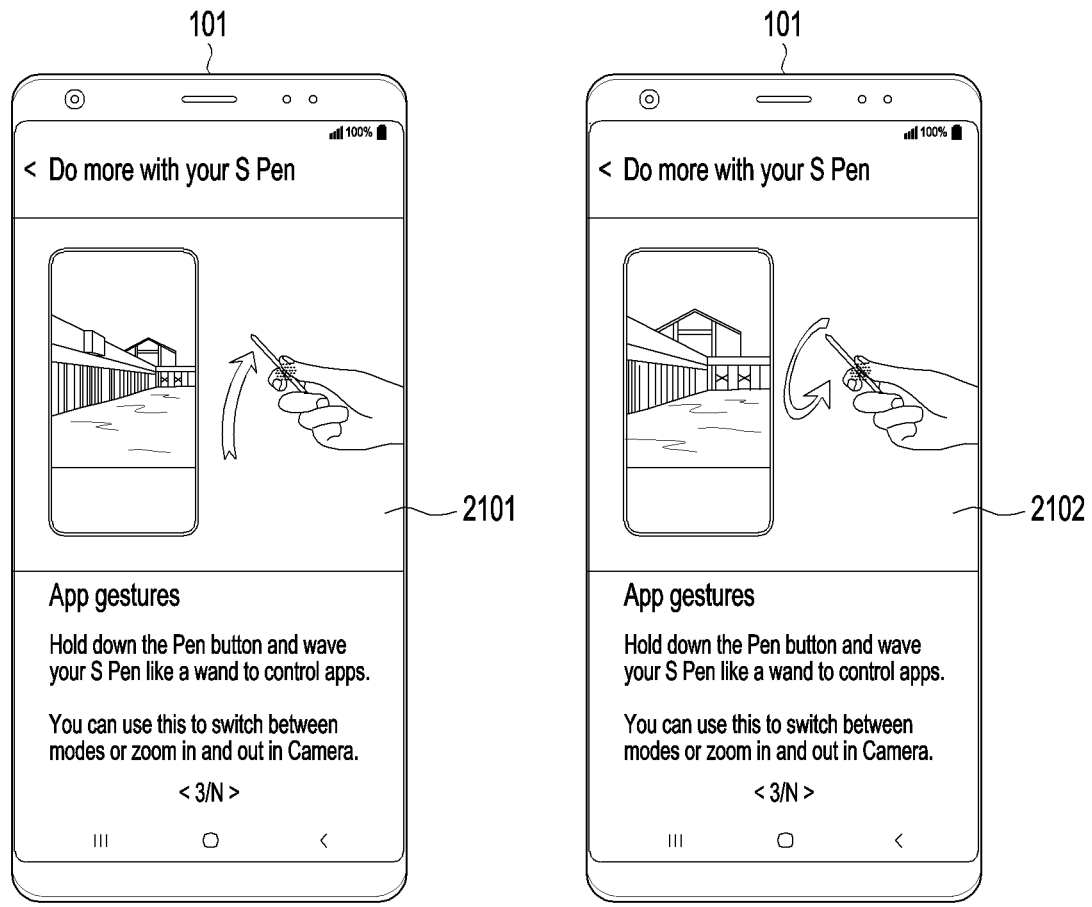
FIG. 21 is a view illustrating a gesture guide screen of an electronic device according to an embodiment of the disclosure.

FIG. 21 is a view illustrating a gesture guide screen of an electronic device according to an embodiment of the disclosure.

The electronic device 101 according to various embodiments may display, for example, a screen 2101 for guiding an upward swipe gesture, and a screen 2102 for guiding a counterclockwise circle gesture. The screens 2101 and 2102 may be images or video images. The electronic device 101 may receive information on a position from the stylus pen 201, and may determine whether a gesture corresponding to the guiding screen is detected based on the received information. When a gesture is detected, the electronic device 101 may output a screen indicating a successful attempt, and when the gesture detection fails, the electronic device 101 may output a screen requesting retry. In various embodiments, the electronic device 101 may identify and store a gesture detection algorithm specialized for the user using the information on the position of the stylus pen 201 detected during the display of the guide screen. Later, when it is identified that the user uses the stylus pen 201, the electronic device 101 may use a gesture detection algorithm stored for each user.

Figure 22A:
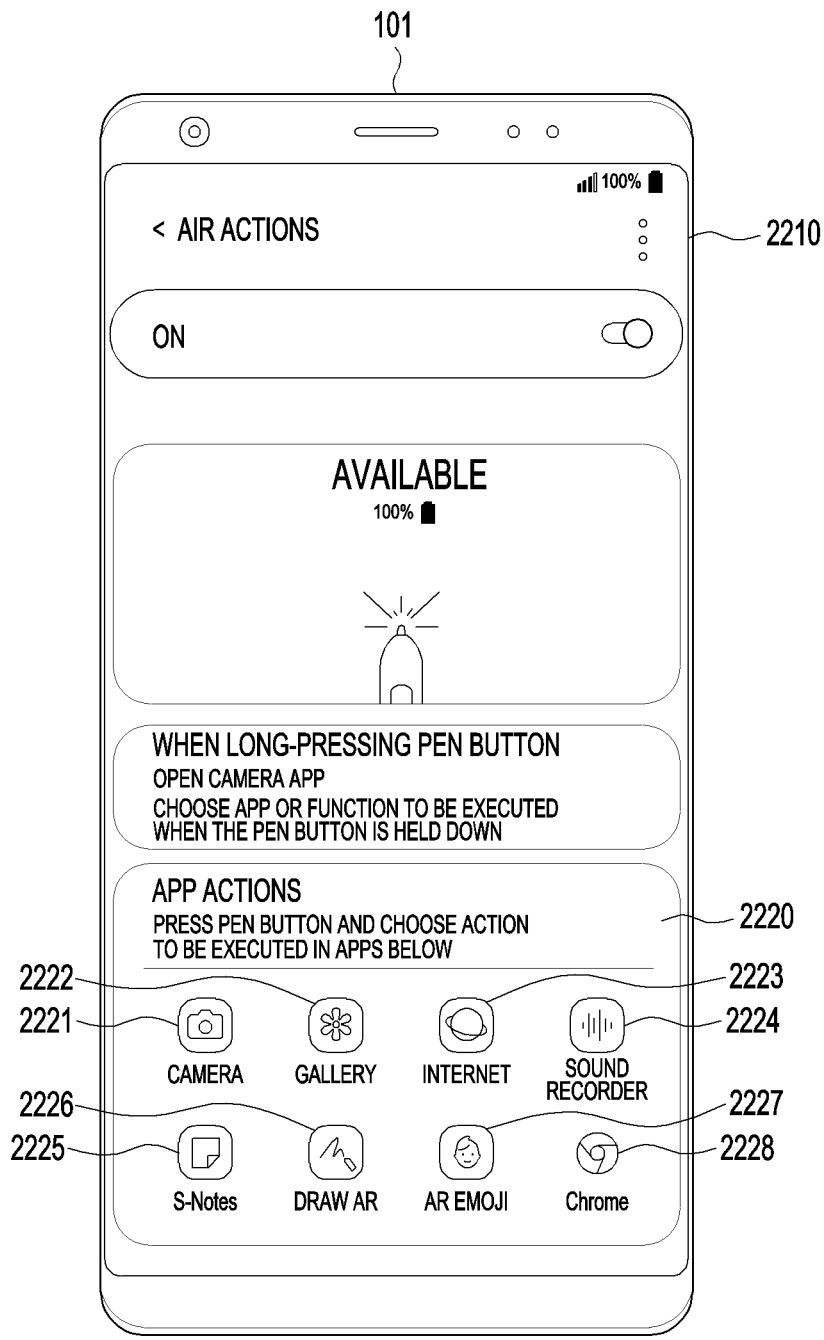
FIG. 22A is a view illustrating a setting screen of an electronic device according to an embodiment of the disclosure.

FIG. 22A is a view illustrating a setting screen of an electronic device according to an embodiment of the disclosure.

Figure 22B:
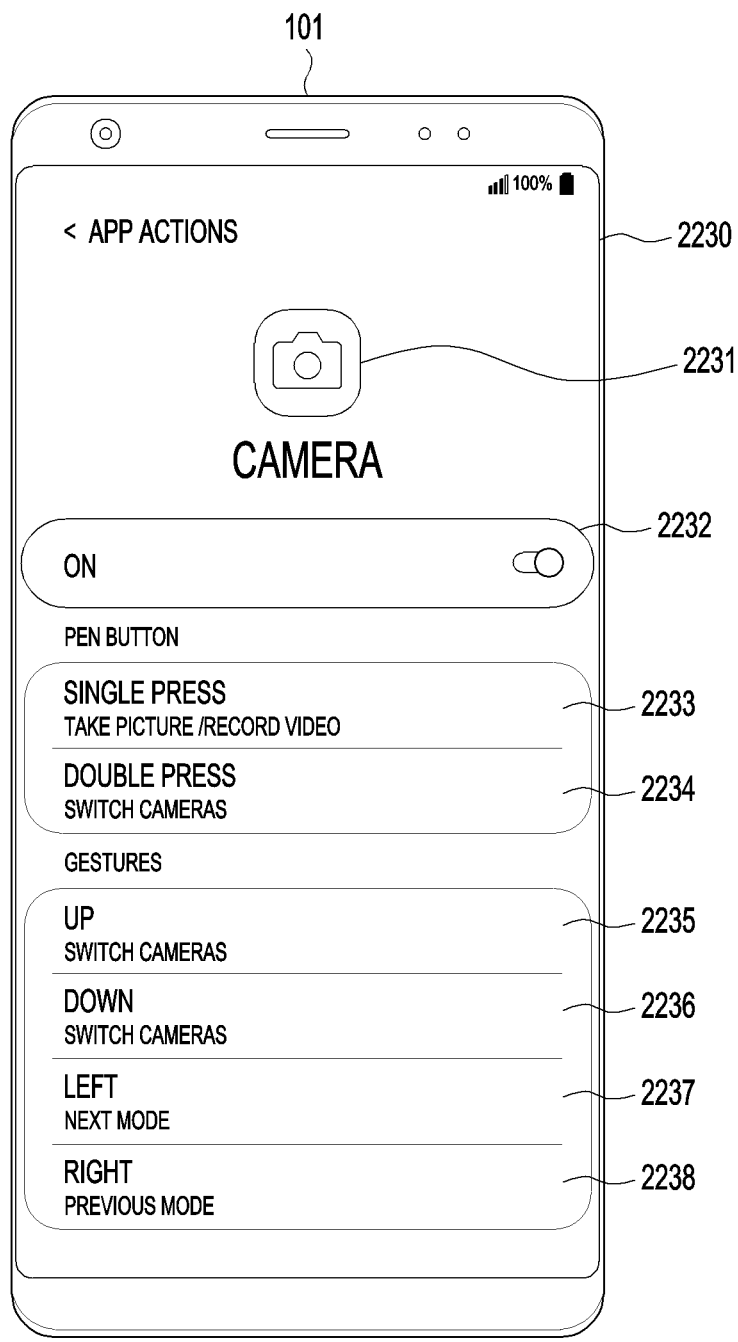
FIG. 22B is a view illustrating a setting screen of an electronic device according to an embodiment of the disclosure.

FIG. 22B is a view illustrating a setting screen of an electronic device according to an embodiment of the disclosure.

Figure 22C:
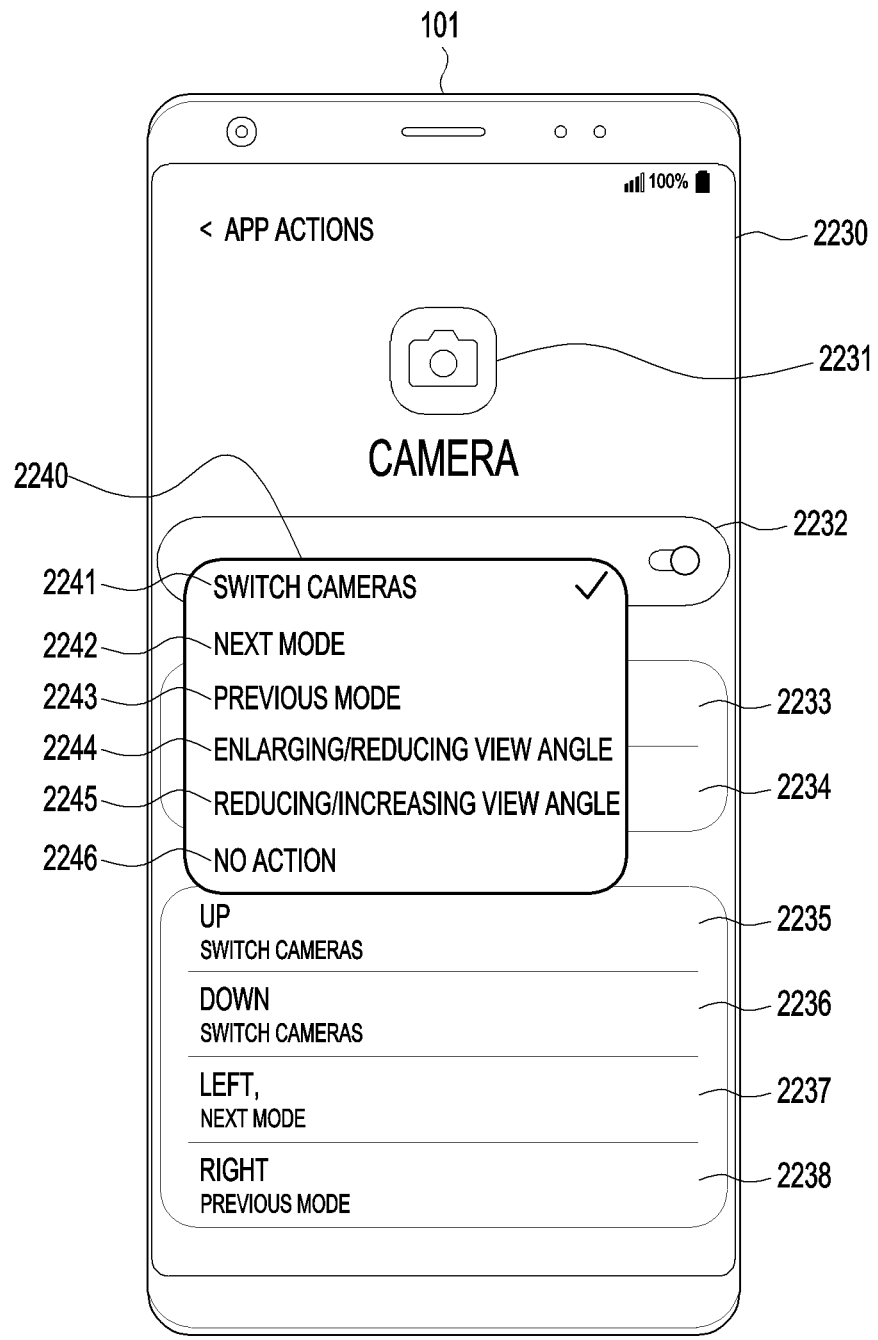
FIG. 22C is a view illustrating a setting screen of an electronic device according to an embodiment of the disclosure.

FIG. 22C is a view illustrating a setting screen of an electronic device according to an embodiment of the disclosure.

Referring to FIG. 22A, the electronic device 101 may display a first screen 2210 for selecting an application. The first screen 2210 may include an icon selection region 2220, and the icon selection region 2220 may include a plurality of icons 2221, 2222, 2223, 2224, 2225, 2226, 2227, and 2228 set to execute applications, respectively. The electronic device 101 may provide a function to add an icon, and the user may add or delete an application for which gesture control is desired.

Referring to FIG. 22B, the electronic device 101 may display a second screen 2230 through which a gesture of a specific application can be selected. The second screen 2230 may be provided, for example, when an icon 2221 corresponding to a camera application of the first screen 2210 is selected. The second screen 2230 may include an object 2231 representing the selected application and a toggle switch 2232 for setting activation of gesture control. In addition, the second screen 2230 may include objects 2235, 2236, 2237, and 2238 corresponding to gestures, and the objects 2235, 2236, 2237, and 2238 may include text for a function currently mapped to the corresponding gesture. The second screen 2230 may include objects 2233 and 2234 for setting a function of a pen button as well as gesture control. When the objects 2233 and 2234 are selected, the electronic device 101 may provide a screen that enables setting of a function corresponding to a corresponding pen button control command (e.g., single press/double press).

Referring to FIG. 22C, based on a user input for selecting the object 2235, the electronic device 101 may display a selection window 2240, on which functions capable of being mapped are selectable, on the second screen 2230, in response to an up gesture. The selection window 2240 may include text indicating the function mapped in response to the current corresponding gesture (e.g., an up gesture), and one or more objects 2242, 2243, 2244, 2245, and 2246, each of which indicates a corresponding one of selectable functions. When any one of the one or more objects 2242, 2243, 2244, 2245, and 2246 is selected and an up gesture is subsequently detected, the electronic device 101 may provide a function corresponding to a newly selected object.

Figure 23A:
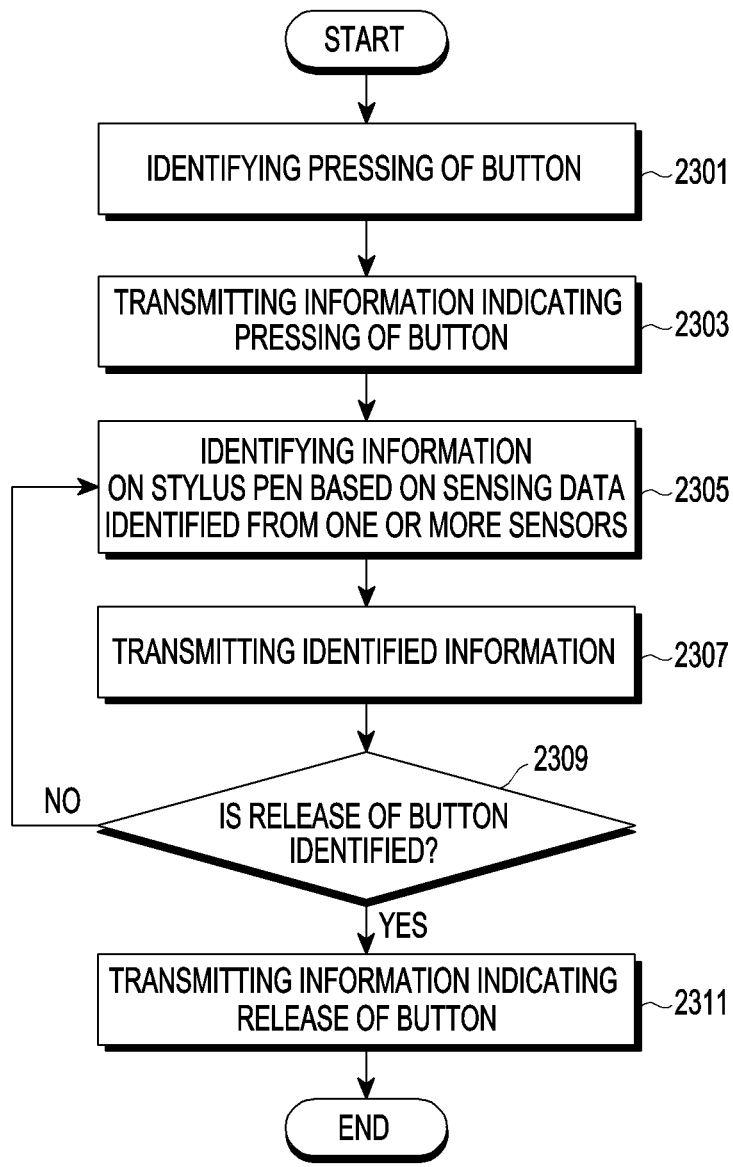
FIG. 23A is a flowchart for describing a method of operating a stylus pen according to an embodiment of the disclosure.

FIG. 23A is a flowchart for describing a method of operating a stylus pen according to an embodiment of the disclosure.

Referring to FIG. 23A, at operation 2301, the stylus pen 201 may identify the pressing of the button (e.g., the button 337). At operation 2303, the stylus pen 201 may transmit information indicating the pressing of the button to the electronic device 101 through the formed communication connection. At operation 2305, the stylus pen 201 may identify information on the position of the stylus pen 201, for example, coordinate information of the stylus pen 201 or displacement information of the stylus pen 201 in a coordinate system based on sensing data identified from one or more sensors. For example, when the pressing of the button is identified, the stylus pen 201 may activate both the gyro sensor and the acceleration sensor to identify information on the position. At operation 2307, the stylus pen 201 may transmit the identified information to the electronic device 101. At operation 2309, the stylus pen 201 may identify whether the release of the button is detected. When the release of the button is not detected (operation 2309: No), the stylus pen 201 may re-identify the information on the position based on sensing data, and may then repeat sending the re-identified information to the electronic device 101. When the release of the button is detected (operation 2309: Yes), at operation 2311, the stylus pen 201 may transmit information indicating the release of the button to the electronic device 101.

Figure 23B:
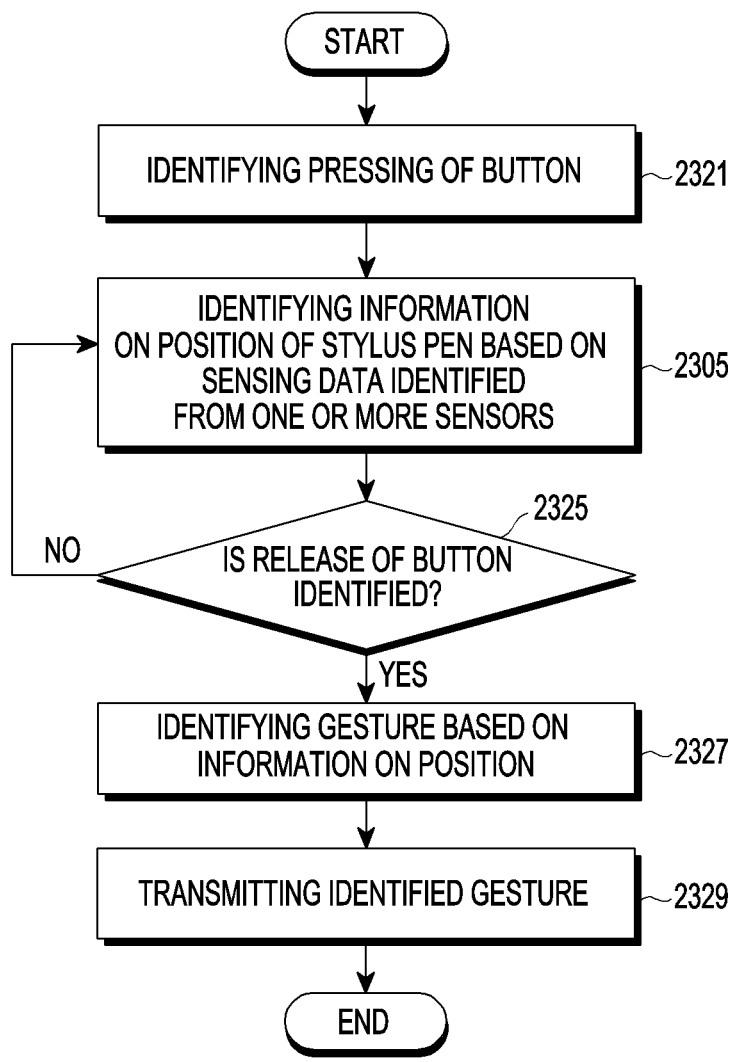
FIG. 23B is a flowchart for describing a method of operating a stylus pen according to an embodiment of the disclosure.

FIG. 23B is a flowchart for describing a method of operating a stylus pen according to an embodiment of the disclosure.

Referring to FIG. 23B, at operation 2321, the stylus pen 201 may identify the pressing of the button (e.g., the button 337). At operation 2323, the stylus pen 201 may identify information on the position of the stylus pen 201 based on sensing data identified from one or more sensors. At operation 2325, the stylus pen 201 may identify whether the release of the button is detected. When the release of the button is not detected (operation 2325: No), the stylus pen 201 may collect sensing data and may repeatedly identify the information on the position of the stylus pen 201, whereby the stylus pen 201 may acquire information on time-series positions of the stylus pen 201. When the release of the button is detected (operation 2325: Yes), the stylus pen 201 may identify a gesture based on the information on the position at operation 2327. The stylus pen 201 may identify the gesture through a method that is at least partially the same as the method in which the above-described electronic device 101 identifies a gesture from the information on the position. At operation 2329, the stylus pen 201 may transmit information indicating the identified information to the electronic device 101. The electronic device 101 may perform an operation corresponding to the information indicating the received gesture.

According to various embodiments, an electronic device 101 may comprise: a sensing panel 503, a communication module 190, at least one processor 120 electrically connected to the sensing panel 503 and the communication module 190, and a memory 130 electrically connected to the at least one processor 120. The memory 130 may store instructions configured to, when executed by the at least one processor 120, cause the at least one processor 120 to: based on a pen signal from the stylus pen 201 being detected through the sensing panel, perform a first operation identified based on the detected pen signal, and based on the pen signal from the stylus pen 201 being not detected through the sensing panel 503, receive, through the communication module 190, at least one communication signal, identify a gesture based on information on a position of the stylus pen 201, included in the received at least one communication signal, and perform a second operation corresponding to the identified gesture.

According to various embodiments, the instructions may be configured to, when executed by the at least one processor 120, cause the at least one processor 120 to: receive, through the communication module 190, a first communication signal including first information indicating start of gesture input before receiving the at least one communication signal, receive, through the communication module 190, a second communication signal including second information indicating termination of the gesture input after receiving the at least one communication signal, and identify the gesture based on identifying the second information included in the received second communication signal.

According to various embodiments, the first information includes information indicating that a button of the stylus pen 201 is in a state of being pressed, and the second information includes information indicating that the button of the stylus pen 201 is in a state of being released.

According to various embodiments, the information on the position of the stylus pen 201 may include at least one of: sensing data acquired by a sensor of the stylus pen 201, coordinates of the stylus pen 201, identified based on the acquired sensing data, or a displacement of the stylus pen 201, identified based on the acquired sensing data.

According to various embodiments, the instructions may be configured to, when executed by the at least one processor 120, cause the at least one processor 120 to: identify one or more candidate gestures using the information on the position of the stylus pen 201, and identify the gesture among the identified one or more candidate gestures.

According to various embodiments, the instructions may be configured to, when executed by the at least one processor 120, cause the at least one processor 120 to: input the information on the position of the stylus pen 201 to a plurality of gesture detection algorithms, each of which determines whether a corresponding gesture has occurred, and identify, as the one or more candidate gestures, one or more gestures corresponding to one or more detection algorithms having a processing result satisfying a specified condition, among processing results of the plurality of gesture detection algorithms.

According to various embodiments, the instructions may be configured to, when executed by the at least one processor 120, cause the at least one processor 120 to: identify a travel distance of each of the one or more candidate gestures, and identify, as the gesture, a candidate gesture corresponding to a maximum travel distance among travel distances of the one or more candidate gestures.

According to various embodiments, the instructions may be configured to, when executed by the at least one processor 120, cause the at least one processor 120 to identify the gesture further based on at least one of a weight for each of the one or more candidate gestures, a score for each of the one or more candidate gestures, or a ratio of the travel distance of each of the one or more candidate gestures to the total distance of the one or more candidate gestures.

According to various embodiments, the instructions may be configured to, when executed by the at least one processor 120, cause the at least one processor 120 to: perform, as the second operation, a function mapped to the identified gesture in an application running in a foreground of the electronic device 101.

According to various embodiments, the instructions may be configured to, when executed by the at least one processor 120, cause the at least one processor 120 to: receive acceleration information of the stylus pen 201 through the communication module 190 while the pen signal from the stylus pen 201 is detected, and identify the first operation based on the detected pen signal and the acceleration information of the stylus pen 201.

According to various embodiments, the instructions may be configured to, when executed by the at least one processor 120, cause the at least one processor 120 to: based on the pen signal being detected, activate a position gesture engine and using the activated position gesture engine, and perform the first operation based on the position of the stylus pen 201 identified by using the activated position gesture engine, and based on the pen signal being not detected, activate a direction gesture engine, and identify the gesture by using the activated direction gesture engine.

According to various embodiments, the first operation includes at least one of providing a pen function, or providing additional information on content being displayed.

According to various embodiments, an electronic device 101 may include: a communication module 190, at least one processor 120 electrically connected to the communication module 190, and a memory 130 electrically connected to the at least one processor 120. The memory 130 may store an instructions configured to, when executed by the at least one processor, cause the at least one processor 120 to: receive, through the communication module 190, a first communication signal including first information indicating start of gesture input from a stylus pen 201, receive, through the communication module 190, a plurality of second communication signals from the stylus pen 201, identify one or more candidate gestures based on information on the position of the stylus pen 201, included in the received plurality of second communication signals, receive, through the communication module 190, a third communication signal after receiving the plurality of second communication signals, identify a gesture satisfying a specified condition among the identified one or more candidate gestures based on identifying second information indicating termination of the gesture input, included in the third communication signal, and perform an operation corresponding to the identified gesture.

According to various embodiments, the first information includes information indicating that a button of the stylus pen 201 is in a state of being pressed, and the second information includes information indicating that the button of the stylus pen 201 is in a state of being released.

According to various embodiments, the information on the position of the stylus pen 201 may include at least one of: sensing data acquired through a sensor of the stylus pen 201, coordinates of the stylus pen 201, identified based on the acquired sensing data, or a displacement of the stylus pen 201, identified based on the acquired sensing data.

According to various embodiments, the instructions may be configured to, when executed by the at least one processor 120, cause the at least one processor 120 to: input the information on the position of the stylus pen 201 to a plurality of gesture detection algorithms, each of which determines whether a corresponding gesture has occurred, and identify, as the one or more candidate gestures, one or more gestures corresponding to one or more detection algorithms having a processing result satisfying another specified condition, among processing results of the plurality of gesture detection algorithms.

According to various embodiments, the instructions may be configured to, when executed by the at least one processor 120, cause the at least one processor 120 to: identify a travel distance of each of the one or more candidate gestures, and identify a candidate gesture corresponding to a maximum travel distance among travel distances of the one or more candidate gestures as the gesture.

According to various embodiments, the instructions may be configured to, when executed by the at least one processor 120, cause the at least one processor 120 to identify the gesture further based on at least one of a weight for each of the one or more candidate gestures, a score for each of the one or more candidate gestures, or a ratio of the travel distance of each of the one or more candidate gestures relative to the total distance of the one or more candidate gestures.

According to various embodiments, a method of operating an electronic device 101 may comprise: based on a pen signal from a stylus pen being detected through a sensing panel 503 of the electronic device 101, performing a first operation identified based on the detected pen signal, and based on the pen signal from the stylus pen 201 being not detected through the sensing panel 503, the method may include: receiving, through a communication module 190 of the electronic device 101, at least one communication signal, identifying a gesture based on information on the position of the stylus pen 201, included in the received at least one communication signal, and performing a second operation corresponding to the identified gesture.

According to various embodiments, the identifying of the gesture may comprise: identifying one or more candidate gestures using the information on the position of the stylus pen 201, and identifying the gesture among the identified one or more candidate gestures.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., the internal memory 136 or the external memory 138) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a sensing panel;
communication circuitry;
at least one processor electrically connected to the sensing panel and the communication circuitry; and
a memory electrically connected to the at least one processor,
wherein the memory is configured to store instructions, when executed by the at least one processor, cause the electronic device to:
receive, through the communication circuitry from a stylus pen, at least one communication signal, the at least one communication signal comprising information on a position of the stylus pen,
identify whether a pen signal by the stylus pen is detected through the sensing panel,
based on the at least one communication signal being received while the pen signal by the stylus pen is detected through the sensing panel:
disregard the information on the position of the stylus pen included in the received at least one communication signal, and
perform a first operation identified based on the detected pen signal identified through the sensing panel while continuing to disregard the information on the position of the stylus pen included in the received at least one communication signal, and
based on the at least one communication signal being received while the pen signal by the stylus pen is not detected through the sensing panel:
identify a gesture based on the information on the position of the stylus pen included in the received at least one communication signal, and
perform a second operation, different by the first operation, corresponding to the identified gesture.

2. The electronic device of claim 1, wherein the instructions, when executed by the at least one processor, further cause the electronic device to:
receive, through the communication circuitry, a first communication signal comprising first information indicating a start of a gesture input before receiving the at least one communication signal,
receive, through the communication circuitry, a second communication signal comprising second information indicating termination of the gesture input after receiving the at least one communication signal, and
based on identifying the second information included in the received second communication signal, identify the gesture.

3. The electronic device of claim 2,
wherein the first information comprises information indicating that a button of the stylus pen is in a state of being pressed, and
wherein the second information comprises information indicating that the button of the stylus pen is in a state of being released.

4. The electronic device of claim 1, wherein the information on the position of the stylus pen comprises at least one of:
sensing data acquired by a sensor of the stylus pen,
coordinates of the stylus pen, identified based on the acquired sensing data, or
a displacement of the stylus pen, identified based on the acquired sensing data.

5. The electronic device of claim 1, wherein the instructions, when executed by the at least one processor, further cause the electronic device to:
identify one or more candidate gestures using the information on the position of the stylus pen, and
identify the gesture among the identified one or more candidate gestures.

6. The electronic device of claim 5, wherein the instructions, when executed by the at least one processor, further cause the electronic device to:
input the information on the position of the stylus pen to a plurality of gesture detection algorithms, wherein each of the plurality of gesture detection algorithms for determining whether a corresponding gesture has occurred, and identify, as the one or more candidate gestures, one or more gestures corresponding to one or more detection algorithms having a processing result satisfying a specified condition among processing results of the plurality of gesture detection algorithms.

7. The electronic device of claim 5, wherein the instructions, when executed by the at least one processor, further cause the electronic device to:
identify a travel distance of each of the one or more candidate gestures, and
identify, as the gesture, a candidate gesture corresponding to a maximum travel distance among travel distances of the one or more candidate gestures.

8. The electronic device of claim 7, wherein the instructions, when executed by the at least one processor, further cause the electronic device to:
identify the gesture further based on at least one of a weight for each of the one or more candidate gestures, a score for each of the one or more candidate gestures, or a ratio of the travel distance of each of the one or more candidate gestures relative to a total distance of the one or more candidate gestures.

9. The electronic device of claim 1, wherein the instructions, when executed by the at least one processor, further cause the electronic device to:
perform, as the second operation, a function mapped to the identified gesture in an application running in a foreground of the electronic device.

10. The electronic device of claim 1, wherein the instructions, when executed by the at least one processor, further cause the electronic device to:
receive, through the communication circuitry, acceleration information of the stylus pen while the pen signal by the stylus pen is detected, and
identify the first operation based on the detected pen signal and the acceleration information of the stylus pen.

11. The electronic device of claim 1, wherein the instructions, when executed by the at least one processor, further cause the electronic device to,
based on the pen signal being detected, activate a position gesture engine and using the activated position gesture engine, and perform the first operation based on the position of the stylus pen, identified by using the activated position gesture engine, and
based on the pen signal being not detected, activate a direction gesture engine, and identify the gesture by using the activated direction gesture engine.

12. The electronic device of claim 1, wherein the first operation includes at least one of providing a pen function, or providing additional information on content being displayed.

13. A method of operating an electronic device, comprising:
receiving, through a communication circuitry of the electronic device from a stylus pen, at least one communication signal, wherein the at least one communication signal comprises information on a position of the stylus pen;
identifying whether a pen signal by the stylus pen is detected through a sensing panel of the electronic device;
based on the at least one communication signal being received while the pen signal by the stylus pen is detected through the sensing panel:
disregarding the information on the position of the stylus pen included in the received at least one communication signal, and
performing a first operation identified based on the detected pen signal identified through the sensing panel while continuing to disregard the information on the position of the stylus pen included in the received at least one communication signal; and
based on the at least one communication signal being received while the pen signal by the stylus pen is not detected through the sensing panel:
identifying a gesture based on the information on the position of the stylus pen, included in the received at least one communication signal, and
performing a second operation, different by the first operation, corresponding to the identified gesture.

14. The method of claim 13, wherein the identifying of the gesture comprises:
identifying one or more candidate gestures using the information on the position of the stylus pen; and
identifying the gesture among the identified one or more candidate gestures.

* * * * *